(12) United States Patent
Fragoso et al.

(10) Patent No.: US 11,167,512 B2
(45) Date of Patent: Nov. 9, 2021

(54) MANUFACTURING APPARATUS

(71) Applicants: Jonathan C. Fragoso, Commerce City, CO (US); Jacob P. Brown, Boulder, CO (US); William G. Coon, Longmont, CO (US); Nicholas R. Jentzsch, Lafayette, CO (US); Michael C. Messaros, Erie, CO (US); Shane K. Vogt, Lafayette, CO (US)

(72) Inventors: Jonathan C. Fragoso, Commerce City, CO (US); Jacob P. Brown, Boulder, CO (US); William G. Coon, Longmont, CO (US); Nicholas R. Jentzsch, Lafayette, CO (US); Michael C. Messaros, Erie, CO (US); Shane K. Vogt, Lafayette, CO (US)

( * ) Notice: Subject to any disclaimer, the term of this patent is extended or adjusted under 35 U.S.C. 154(b) by 74 days.

(21) Appl. No.: 16/800,226

(22) Filed: Feb. 25, 2020

(65) Prior Publication Data
US 2020/0189218 A1   Jun. 18, 2020

Related U.S. Application Data

(63) Continuation-in-part of application No. 15/645,696, filed on Jul. 10, 2017, now Pat. No. 10,611,552.
(Continued)

(51) Int. Cl.
*B65D 3/04* (2006.01)
*B29D 22/00* (2006.01)
(Continued)

(52) U.S. Cl.
CPC ......... *B29D 22/003* (2013.01); *A01M 25/006* (2013.01); *B25J 15/08* (2013.01);
(Continued)

(58) Field of Classification Search
CPC .... A01M 23/00; A01M 25/00; A01M 25/002; A01M 25/006; B25J 15/08; B25J 15/083;
(Continued)

(56) References Cited

U.S. PATENT DOCUMENTS 2,709,400 A * 5/1955 Bugg ........................ B31C 3/00
                                                    493/301
3,400,029 A * 9/1968 Mesrobian ............ B29C 53/581
                                                    156/82
(Continued)

*Primary Examiner* — David J Parsley
(74) *Attorney, Agent, or Firm* — Roger A. Jackson

(57) ABSTRACT

A manufacturing apparatus for assembling a container including a sleeve, a bowl cover with a cavity, a closed state clamshell with a hinge having a mating protrusion, and a flexible strip having a primary and secondary end portions that are affixed with adhesive between the cover and clamshell. The manufacturing apparatus includes a base, a spindle, with primary and secondary radially extending platforms, respectively supporting primary and secondary cradles with the bowl and clamshell disposed therebetween the cradles that are rotated. The manufacturing apparatus also includes a guide slidably engaged to the base, wherein the guide directs the strip to be helically wound about the clamshell and cover with a base slide mounted adhesive nozzle that affixes the primary and secondary end portions of the strip to the cover and clamshell with a head that cuts and holds the strip with the head slidably engaged to the base.

9 Claims, 27 Drawing Sheets

Related U.S. Application Data which is a continuation-in-part of application No. 14/601,210, filed on Jan. 20, 2015, now Pat. No. 9,730,438.

(51) Int. Cl.
*A01M 25/00* (2006.01)
*B25J 15/08* (2006.01)
*B29L 31/00* (2006.01)

(52) U.S. Cl.
CPC ............. *B65D 3/04* (2013.01); *A01M 25/002* (2013.01); *B29L 2031/712* (2013.01)

(58) Field of Classification Search
CPC ...... B25J 15/086; B29D 22/00; B29D 22/003; B65D 3/00; B65D 3/04
USPC ................. 43/124, 131; 493/52, 56, 84, 128
See application file for complete search history.

(56) References Cited

U.S. PATENT DOCUMENTS

| | | | | |
|---|---|---|---|---|
| 3,457,130 | A * | 7/1969 | Morrison | B31C 3/00 156/190 |
| 3,695,971 | A * | 10/1972 | Corning | B29C 66/5432 156/272.2 |
| 3,783,908 | A * | 1/1974 | Stump | B29C 53/581 138/144 |
| 4,120,323 | A * | 10/1978 | Saul | B31C 11/02 138/119 |
| 6,027,439 | A * | 2/2000 | Busse | B31C 3/00 493/104 |
| 8,337,375 | B2 * | 12/2012 | Lee | B31C 3/00 493/301 |

* cited by examiner

MANUFACTURING APPARATUS

RELATED PATENT APPLICATIONS

This is a continuation in part (CIP) patent application of U.S. patent application Ser. No. 15/645,696 filed on Jul. 10, 2017 by Michael C. Messaros et al., of Erie, Colo., US, that is a continuation in part (CIP) patent application of U.S. patent application Ser. No. 14/601,210 (Now U.S. Pat. No. 9,730,438) filed on Jan. 20, 2015 by Michael C. Messaros et al., of Erie, Colo., US,

STATEMENT OF UNITED STATES FEDERALLY FUNDED RESEARCH

This invention was made with government support under the Animal and Plant Health Inspection Service (APHIS Agreement No. 11-7415-0842-CA) awarded by the United States Department of Agriculture. The United States government has certain rights in the invention.

TECHNICAL FIELD

The present invention relates generally to the deploying of an article and associated article dispenser apparatus arts. More particularly, the present invention of the manufacturing apparatus facilitates making the article disposed and stored within a dispenser apparatus wherein the article is transported to a selected location within an external environment and then the article is placed into a selected location within external environment.

BACKGROUND OF INVENTION

The present invention of the manufacturing apparatus addresses broadly a problem in the overpopulation of the invasive brown tree snake that was most likely inadvertently introduced into Guam probably from New Guinea over seventy years ago; supposedly via post World War II cargo shipments. Since its introduction, the brown tree snake has colonized the entire island of Guam, at densities of up to about 33 snakes per acre in Guam or approximately 1 to 2 million brown tree snakes inhabit the 200 square mile island of Guam. These venomous brown tree snakes have caused the extinction of most of Guam's native birds, bats, and lizards; also the brown tree snakes are feeding on young poultry and other small livestock; in addition to threating human health and safety. Further, the brown tree snakes also cause electrical power outages throughout Guam via wiring damage causing millions of dollars in electrical infrastructure structural damages and lost revenue. The desire for practical technology to aerially deliver baits for brown tree snake control is widespread and has existed for decades. Interested parties include the United States Department of Defense, the United States Department of the Interior, the United States Fish and Wildlife Service, the United States Office of Insular Affairs, the United States Department of Agriculture, the Government of Guam, and others.

In answer to the above identified problem; Federal, state, and territorial governments are committed to reducing the brown tree snake population in Guam, thus also helping to prevent the dispersal of brown tree snakes from Guam to adjacent areas and mitigating the negative effects of the brown tree snakes on Guam. The dispersal of brown tree snakes from Guam via the unintentional movement of snakes as a result of shipping or travel is a very real danger to all islands in the Western Pacific basin and sections of the United States mainland.

To prevent the spread of the brown tree snake, the United States Department of Agriculture's Wildlife Services (WS) program partners with the Government of Guam's Department of Agriculture, the United States Department of Defense (DoD), the United States Department of the Interior's (DoI) Office of Insular Affairs, and the United States Fish and Wildlife Service. A variety of brown tree snake control tools and strategies have been employed, including the use of traps, fumigants, hand capture, snake-detector dogs, public education, and an oral toxicant. A particular toxicant, named acetaminophen, was granted a registration by the United States Environmental Protection Agency in 2003 based on research conducted by Wildlife Service National Wildlife Research Center (NWRC) scientists. The acetaminophen toxicant is currently used in bait stations around shipping ports, the airport, and other easily accessible areas of the Guam Island to help eradicate the brown tree snake. The motivation and desire to develop and implement a practical technology to aerially deliver baits for brown tree snake control has existed for decades.

In summary the benefits of eradicating the brown tree snake population in Guam would be;

1. Facilitating the reintroduction of the endangered Guam Rail and other native species extirpated by the brown tree snake and the restoration of Guam's native ecosystems.
2. Reducing the number of brown tree snake bites to humans and pets (Currently, 1 in 10 emergency room visits in Guam are due to a brown tree snake bite.)
3. Reducing power outages and electrical power infrastructure damage from brown tree snakes electrocuting themselves on power lines and other structures (Currently costs Guam $1-4 million in damages and lost productivity annually.)
4. Preventing brown tree snake colonization on Hawaii or other vulnerable islands in the Pacific (The economic costs of potential brown tree snake colonization to the Hawaiian Islands alone are estimated to be as high as $2 billion annually.)
5. Saving millions of dollars in brown tree snake control costs. The current brown tree snake management protocols are primarily based on the use of traps and snake detector dogs. The overall annual budget for research, educational campaigns, and control efforts (trapping, bait stations, snake detector dogs, aerial baiting, etc.) is approximately $7.5 million annually. The use of toxic bait is currently limited because of the cost and ability to reach all the brown tree snakes in an area. Current bait production depends upon manually inserting an acetaminophen pill into a dead mouse and hand placing dead mice in bait stations. In addition, since the brown tree snakes are arboreal (tree dwelling), a large portion of the snakes will not be exposed to the baits on the ground surface. Employment of a cost-effective aerial baiting strategy will significantly reduce the cost of conducting a brown tree snake baiting program. It is estimated that a Guam snake eradication effort would require the delivery of about 5.2 million baits. At an estimated cost of about $0.99 per bait, this effort would be less costly than the currently annual expenses for brown tree snake control on Guam. However, currently, efforts to reduce the brown tree snake population across Guam have been fairly limited because snakes from rugged and remote areas of Guam have been able to successfully repopulate areas that were once cleared.

Looking at the prior art is this area in the baiting and manufacturing/dispensing/distribution arts for not only pest control, but also bait/cartridge dispensing and distribution, starting with U.S. Pat. No. 8,024,889 Bunker, disclosed is a pest control method and apparatus that includes a two piece capsule that is in the form of a like mating pair of separable symmetric spherical shells 25 that are tied to one another via an extension 120 that has a releaser 20 disposed on the extension 120. Bunker also has the capsule broken down into version type I being identified as 30 and version type II being identified as 60, thus with version I being spherical-see Bunker FIGS. 1 and 2 and version II being cylindrical-see FIGS. 3, 4A, 4B, 5, 9, and 10. In looking at Bunker FIGS. 4A and 4B, the releaser 20 can either be stowed within the capsule or outside of the capsule, wherein the capsule dispensing gun 130, (Bunker's dispenser apparatus), see FIG. 5, apparently only uses the FIG. 4A version. Bunker has no teaching on how the capsule in FIG. 4A separates in using gun 130 in FIG. 5, other than states the capsule may "separate", see column 3, lines 45-50. In fact the only way that Bunker's capsule could separate on deployment is to have a very loose attachment as between the capsule halves as pictorially shown in FIG. 3, wherein a small partial semi-circular pilot between the capsule halves is shown (element 90 points to this-but is really identifying the interior), if the capsule halves 70/80 where completely disposed one within the other, Bunker's principal of operation would be frustrated as there would be insufficient force to separate the capsules to expose the releaser in the tree branches as shown in FIGS. 6 and 7.

Continuing in the prior art related to ejecting a cartridge not in the snake baiting arts, in U.S. Pat. No. 5,403,225 to Watkins, disclosed is an aerial display amusement device that comprises an elongated, hollow tube containing a plurality of pieces of confetti within the hollow interior of a tube. The user in Watkins holds the lower end of the elongated tube and waves the tube forwardly in an arcuate path so as to generate sufficient centrifugal force to eject the confetti out of the tube and upwardly into the air. In the preferred embodiment in Watkins, the pieces of confetti are of four-sided, tetragonal shape, and pluralities of pieces of confetti are stacked in bundles within the tube such that the bundles exit the tube upwardly in the air and then burst into an aerial display of color and motion as the individual confetti pieces fall downwardly. Watkins is a manually operated device; see FIG. 6, whose primary purpose is to widely dispense the confetti from the tetragonal shape and having the confetti stacked in the tube in a manner that the tetragonal shapes are parallel to one another for maximum dispersion upon release from the tube via manual creation of centrifugal force.

Further, in the prior art related to ejecting a cartridge not in the snake baiting arts, in U.S. Pat. No. 6,692,335 to Wakins, disclosed is a non-explosive system for manual hand launching of streamers from a hollow tube comprising; an elongated hollow launching tube having an open end when launching streamers, a plurality of spiral wound streamers positioned in the launching tube, the streamers being positioned in rows along the length of said launching tube, plus at least the streamers in the row closest to the open end having open hollow cores before insertion into the launching tube and having collapsed cores when inserted into the launching tube, as shown in FIGS. 2, 3, and 4. Thus in Watkins, this is to bias the streamers radially outwardly and form a frictional resistance against ejection of the streamers from the tube, and wherein at least the streamers in the row closest to the open end have central axes about which the streamers are wound, and wherein the central axes are oriented parallel to each other, see FIGS. 1 and 6. As opposed to Watkins '225 (confetti launching) this Watkins '335 is operational to focus on the launching of streamers manually which requires a significant amount of exit force emanating from the manually generated centrifugal force which is forced to be higher from the frictional resistance mentioned above, and also the packed streamers should have higher mass or weight the closer they are to the center of manual centrifugal rotation in order for the higher mass streamers to "push out" the lower mass or weight streamers that are farther from the center of manual centrifugal rotation.

What is needed is a manufacturing apparatus for making an article termed specifically a container apparatus for improving the way to effectively eradicate the brown tree snake in their arboreal environment using poisonous baits contained in the article. Thus in a broad sense, a manufacturing apparatus is needed to make brown tree snake article baits which could be dropped from an aircraft or even thrust upward from the ground surface and with the bait from the article becoming entangled in the thicket growth or forest canopy as the bait falls to the ground, being that the brown tree snake is an arboreal species, entanglement in the forest canopy is crucial for effective baiting. In addition to improving the performance of the needed baiting apparatus, the U.S. Department of Agriculture's (USDA) Wildlife Services (WS) brown tree snake control program has a high desire for a system for mass producing the bait cartridges (being required in the millions) and an automated device for reliable and systematic aerial delivery being the dispenser apparatus of the article bait cartridges.

Ideally a biodegradable bait cartridge and delivery system through the dispenser apparatus would be utilized that can disperse up to about 4 baits per second desirably resulting in a bait about every 15 meters of lateral forest canopy via helicopter or fixed wing aircraft or alternatively ground surface launching of bait cartridges also resulting in a bait about every 15 meters of lateral forest canopy. The development of an article in the form of a biodegradable bait cartridge and automated aerial bait delivery system in the dispenser apparatus would finally allow for large-scale, simultaneous control of brown tree snake populations throughout Guam thereby helping to prevent brown tree snake repopulation.

SUMMARY OF INVENTION

Broadly, the present invention is of a manufacturing apparatus for assembling components of a container apparatus, the container apparatus having a longitudinal axis, a surrounding sidewall sleeve, a bowl shaped cover with a cavity disposed in the cover opposite of the bowl shape, a folded closed state clamshell element with a hinge having a mating protrusion, a flexible planar strip having a primary end portion and a secondary end portion that are affixed with adhesive between respectively the cover and the clamshell element. The manufacturing apparatus includes a base structure including a spindle that rotates about a spindle axis, the spindle has a primary radially extending platform and a parallel positioned secondary radially extending platform, further including a primary cradle that is rotationally engaged about a cradle axis to the primary radially extending platform, the primary cradle having a primary cradle concave portion and a primary cradle convex portion.

In addition the manufacturing apparatus includes a secondary cradle that is rotationally engaged about the cradle axis to the secondary radially extending platform, the secondary cradle having a secondary cradle concave portion and a secondary cradle convex portion, wherein the primary cradle convex portion is positioned to face the secondary cradle concave portion. Also included in the manufacturing apparatus is a guide assembly that is slidably engaged and having a guide assembly slidable movement to the base structure along a guide assembly axis, wherein the guide assembly axis is positioned parallel to the cradle axis, wherein the guide assembly operationally guides the flexible planar strip along the cradle axis.

The manufacturing apparatus further includes a first means for imparting rotational movement to the primary cradle about the cradle axis and a second means for imparting the guide assembly slidable movement to the guide assembly between the primary and the secondary cradles simultaneously with the first means for imparting rotational movement. Wherein operationally, for the manufacturing apparatus the cover bowl shape is placed upon said primary cradle convex portion and the folded closed state clamshell element hinge mating protrusion is disposed within the cover cavity providing for rotational engagement between the cover and the clamshell element about the cradle axis. Further, the non-hinge end of the folded clamshell element is disposed within the secondary cradle concave portion thus facilitating the cover and the clamshell element rotating in unison about the cradle axis, next affixing the secondary end portion of the flexible planar strip to the clamshell element adjacent to the secondary cradle, activating the first and second means to helically wind the flexible planar strip progressively toward the cover and affixing the primary end portion of the flexible planar element to the cover adjacent to the primary cradle.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

In FIG. 16 the cutting and holding head has cut the flexible planar strip with the head holding and retracting the flexible planar strip away from the container apparatus while the valved adhesive nozzle has affixed the primary end portion of the flexible planar strip to the cover;

FIG. 17 shows a perspective view of the manufacturing apparatus showing in particular the clamshell element and cover with the completed and affixed flexible planar strip having the helical progression as shown in FIGS. 13, 14, 15, and 16, wherein FIG. 17 shows rotation of the spindle in particular the primary radially extending platform to move the clamshell element, cover, flexible planar strip, primary and secondary cradles thus clearing away from the valved adhesive nozzle, the cutting and holding head, and the guide assembly to prepare for the sleeving operation.

FIG. 18 shows a perspective view of the manufacturing apparatus showing in particular the clamshell element and cover with the completed and affixed flexible planar strip having the helical progression as shown in FIGS. 13, 14, 15, 16, and 17, wherein FIG. 18 shows a split grasping clamp through its pivotal attachment to the base structure encompassing the clamshell element, cover, and flexible planar strip all together to facilitate a removing of the secondary cradle from the non hinge protrusion portion of the clamshell element, wherein the clamshell element, cover, flexible planar strip are all supported without the secondary cradle as shown ion FIG. 19;

FIG. 19 shows a perspective view of the manufacturing apparatus showing in particular the clamshell element and cover with the completed and affixed flexible planar strip having the helical progression as shown in FIGS. 13, 14, 15, 16, and 17, wherein FIG. 19 shows the split grasping clamp through its pivotal attachment to the base structure encompassing the clamshell element, cover, and flexible planar strip all together, wherein the secondary cradle is shown removed from the non hinge protrusion portion of the clamshell element, wherein the clamshell element, cover, flexible planar strip are all supported about the cradle axis without the secondary cradle removed as shown to facilitate the sleeving operation;

FIG. 20 shows a perspective view of the manufacturing apparatus showing in particular the clamshell element and cover with the completed and affixed flexible planar strip having the helical progression as shown in FIGS. 13, 14, 15, 16, and 17, wherein FIG. 20 shows the split grasping clamp through its pivotal attachment to the base structure encompassing the clamshell element, cover, and flexible planar strip all together, wherein the secondary cradle is shown removed from the non hinge protrusion portion of the clamshell element, wherein the clamshell element, cover, flexible planar strip are all supported about the cradle axis without the secondary cradle removed as shown to facilitate the sleeving operation that shows a sleeving assembly positioned over the clamshell element, the sleeving assembly including a pivotal attachment to the base structure, a reciprocating piston having a reciprocating axis, and the surrounding sidewall disposed within the sleeving assembly;

FIG. 21 shows a perspective view of the manufacturing apparatus showing in particular the clamshell element and cover with the completed and affixed flexible planar strip having the helical progression as shown in FIGS. 13, 14, 15, 16, and 17, wherein FIG. 21 shows the split grasping clamp through its pivotal attachment to the base structure, with the split grasping clamp drawing away the clamshell element, cover, and flexible planar strip all together, wherein the secondary cradle is shown removed from the non hinge protrusion portion of the clamshell element, wherein the clamshell element, cover, flexible planar strip are all supported about the cradle axis via the sleeving assembly without the secondary cradle, as the sleeving assembly is positioned over the clamshell element, the sleeving assembly including a pivotal attachment to the base structure, a reciprocating piston having a reciprocating axis, and the surrounding sidewall disposed within the sleeving assembly, wherein the piston drives the surrounding sidewall over the helically wound flexible planar strip, clamshell element, and cover;

FIG. 22 shows a perspective view of the manufacturing apparatus showing in particular the assembled container apparatus that includes the surrounding sidewall, the clamshell element, and the cover with the completed and affixed flexible planar strip having the helical progression as shown in FIGS. 13, 14, 15, 16, and 17, wherein FIG. 22 shows the surrounding sidewall completely driven down over the clamshell element, and the cover with the completed and affixed flexible planar strip, wherein the sleeving assembly is drawing away from the assembled container apparatus, with the container apparatus supported by the primary cradle and the sleeving assembly about the cradle axis;

REFERENCE NUMBERS IN DRAWINGS

Figure 8:
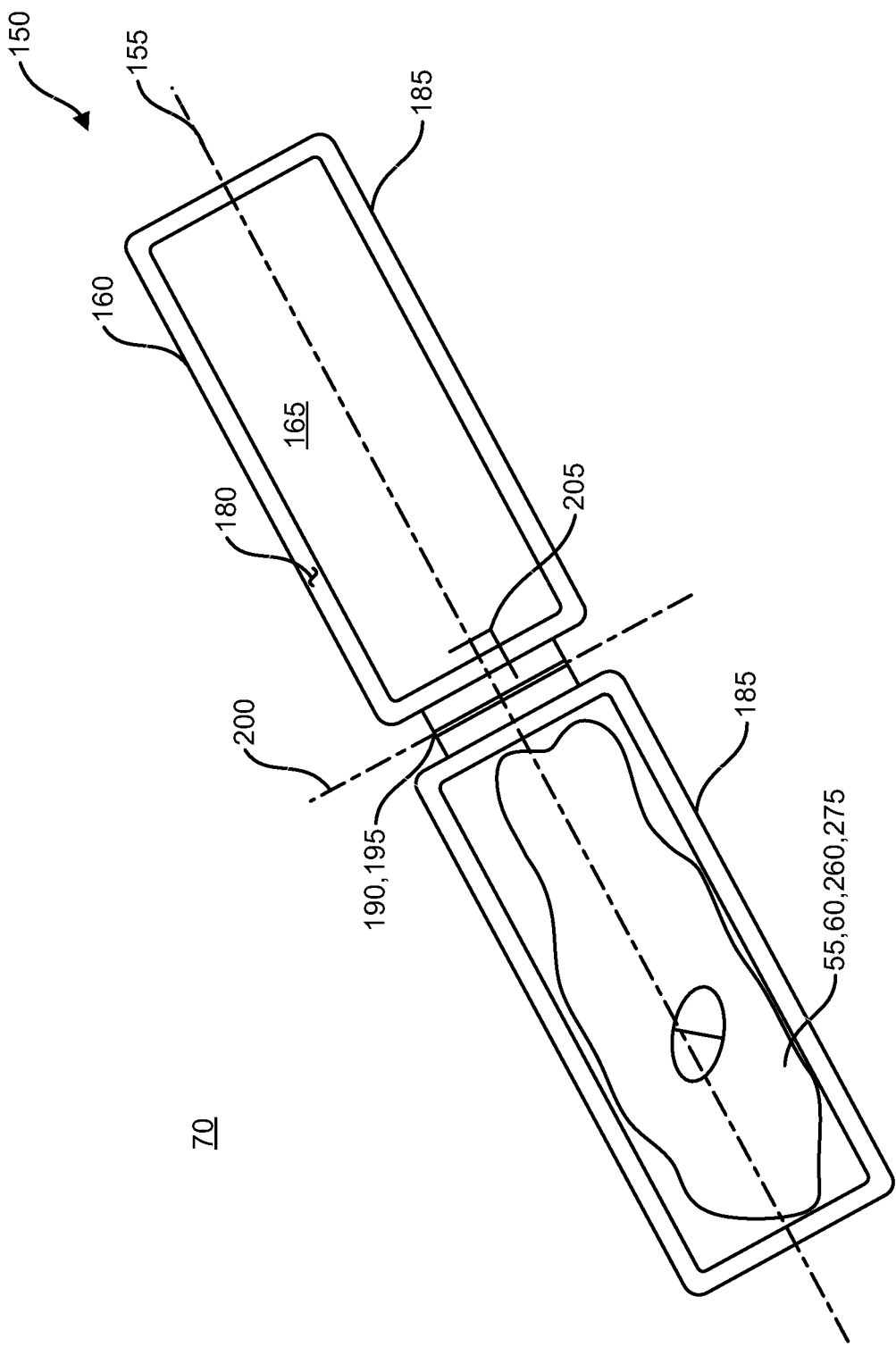
FIG. 8 shows a perspective view of the clamshell element in the open state with the surrounding sidewall removed, also shown is the split boundary with the partial clamshell elements apart from one another at the split boundary the hinge, the mating protrusion of the hinge, the first pivotal axis of the hinge, a perpendicular relationship of the longwise axis and the first pivotal axis, and the longwise axis, wherein the article that is disposed within the inner void being exposed to the external environment.

50 Container apparatus
55 Article
60 Article 55 in the form of a poisoned bait or preferably a mouse pup containing an acetaminophen dose
70 External environment
75 Surrounding sidewall
80 Surrounding sidewall 75 in the form of a cylinder sleeve
85 Longitudinal axis of the surrounding sidewall 75
90 First end portion of the surrounding sidewall 75
95 First aperture of the first end portion 90
100 First margin portion of the first aperture 95
105 Second end portion of the surrounding sidewall 75
110 Second aperture of the second end portion 105
115 Second margin portion of the second aperture 110
120 Inner surface of the surrounding sidewall 75
125 Outer surface of the surrounding sidewall 75
130 Interior of the surrounding sidewall 75
135 Rotational axis of the surrounding sidewall 75
140 Position of the rotational axis 135 essentially at a mid-point as between the first 90 and second 105 end portions
145 Perpendicular position of the rotational axis 135 to the longitudinal axis 85
150 Capsule or clamshell element
155 Longwise axis of the capsule or clamshell element 150
160 Outer periphery surface of the capsule or clamshell element 150
165 Inner void of the capsule or clamshell element 150
170 Slidable engagement of the outer periphery 160 to the inner surface 120 placing the capsule or clamshell element 150 in the closed state 210
180 Split boundary of the capsule or clamshell element 150 that can be along the longwise axis 155
185 Partial capsule or clamshell elements that can be a pair of capsule elements or clamshell halves
190 Hinge of the clamshell element 150
195 Mating protrusion of the hinge 190
200 First pivotal axis of the hinge 190
205 Perpendicular position of the first pivotal axis 200 to the longwise axis 155
210 Closed state of the capsule or clamshell element 150
215 Adjacent position of the partial capsule or clamshell elements 185 at the split boundary 180
220 Removable contact of the partial capsule elements or pair of clamshell halves 185 at the split boundary 180
230 Open state of the capsule or clamshell element 150 see FIG. 8
260 Article 55 disposed within the inner void 165
265 Affixment of the article 55 to a portion of the inner void 165
275 Article 55 exposed to the external environment 70 when the capsule or clamshell element 150 is in the open state 230
285 Elongated flexible member
290 Primary end portion of the elongated flexible member 285
295 Secondary end portion of the elongated flexible member 285
300 Mid portion of the elongated flexible member 285

305 Disposing of the elongated flexible member 285 between the inner surface 120 and the outer periphery 160
310 Affixment of the primary end portion 290 to the surrounding sidewall 75
315 Affixment of the secondary end portion 295 to the clamshell element 150
345 Elongated flexible member 285 in the form of a planar strip
350 Wound form of the planar strip 345 about the outer periphery 160
355 Spiral form of the wound form 350
360 Helical spiral form of the spiral form 355
370 Cover
375 Affixing of the cover 370 to the first margin portion 100
380 Resting removable contact of the capsule or clamshell element 150 or the hinge 190 as against the cover 370
385 Resting removable engagement contact of the mating protrusion 195 of the hinge 190 to the cavity 435 of the dome shaped 410 cover 370
410 Dome shape of the cover 370
415 Projection inwardly of the dome shape 410 toward the sidewall interior 130
420 Cover 370 disposed within a portion of the sidewall interior 130
425 Affixment of the cover 370 to a portion of the inner surface 120
430 Affixment of the planar strip 345 primary end portion 290 to the cover 370
435 Cavity of the cover 370 dome shape 410 for receiving the mating protrusion 195 of the hinge 190
600 Manufacturing apparatus
605 Base structure
610 Spindle
615 Rotation of the spindle 610
620 Spindle 610 axis
625 Primary radially extending platform
630 Secondary radially extending platform
635 Parallel position between the primary radially extending platform 625 and the secondary radially extending platform 630
640 Primary cradle
645 Cradle axis
650 Rotational engagement of the primary cradle 640 about the cradle axis 645 to the primary radially extending platform 625
655 Primary cradle 640 concave portion
660 Primary cradle 640 convex portion
665 Secondary cradle
670 Rotational engagement of the secondary cradle 665 about the cradle axis 645 to the secondary radially extending platform 630
675 Secondary cradle 665 concave portion
680 Secondary cradle 665 convex portion
685 Face positioning of the primary cradle 640 convex portion 660 to the secondary cradle 665 concave portion 675
690 Guide assembly
695 Slidable engagement of the guide assembly 690 to the base structure 605
700 Slidable movement of the guide assembly 690
705 Guide axis
710 Parallel position of the guide axis 705 to the cradle axis 645
715 Guide assembly guiding the flexible planar strip 345
720 Rotational movement of the primary cradle 640 about the cradle axis 645
725 First means for imparting rotational movement 720 to the primary cradle 640 about the cradle axis 645
730 Electric motor or pneumatic motor for the first means 725 for imparting rotational movement 720 to the primary cradle 640 about the cradle axis 645
735 Second means for imparting the guide assembly 690 slidable movement 700
740 Electric solenoids or pneumatic actuators for the second means 735 for imparting the guide assembly 690 slidable movement 700
745 Cover and clamshell element rotating 720 in unison about the cradle axis 645
750 Valved adhesive nozzle assembly
755 Slidable engagement of the valved adhesive nozzle assembly 750
760 Slidable movement of the valved adhesive nozzle assembly 750
765 Adhesive nozzle axis
770 Parallel position of the adhesive nozzle axis 765 to the cradle axis 645
775 Electric solenoids or pneumatic actuators for the slidable movement 760 of the valved adhesive nozzle assembly 750
780 Holding and cutting head for the flexible planar strip 345
785 Slidable engagement of the head 780 to the base structure 605
790 Head 780 sliding movement
795 Head 780 sliding movement axis
800 Head 780 reciprocating movement
805 Head 780 reciprocating axis
810 Perpendicular position of the reciprocating head axis 805 to the cradle axis 645
815 Parallel position of the cradle axis 645 to the head sliding movement axis 795
820 Electric solenoids or pneumatic actuators for the head sliding movement 790 and the head reciprocating movement 800
825 Arcuate finger element
830 Partial circumvent of the cradle axis 645 by the arcuate finger element 825
835 Nest of the secondary end portion 295 of the flexible planar strip 345 to be adjacent to the outer surface 125 of the surrounding sidewall 75 via the arcuate finger element 825
840 Sleeving assembly
845 Pivotal attachment of the sleeving assembly 840 to the base structure 605
850 Reciprocating piston of the sleeving assembly 840
855 Reciprocating axis of the sleeving assembly 840
860 Driving the surrounding sidewall 75 over the helically wound 360 flexible planar strip 345, clamshell element 150, and cover 370
865 Reciprocating mechanism of the secondary cradle 665
870 Pivoting mechanism of the secondary cradle 665
875 Secondary cradle 665 reciprocating axis
880 Secondary cradle 665 pivoting axis
885 Removing the secondary cradle 665 from the non hinge end of the folded clamshell element 150
890 Split grasping clamp
895 Pivotal attachment to the base structure 605 of the split grasping clamp 890
900 Clamp 890 pivotal axis
905 Split grasping clamp 890 encompassing the clamshell element 150 or surrounding sidewall 75 for container apparatus 50 support without the secondary cradle 665 or sleeving assembly 840

910 Split grasping clamp 890 drawing and moving away from the clamshell element 150

915 Sleeving assembly 840 positioned over the clamshell element 150 allowing the split grasping clamp 890 to draw away 910 from the clamshell element 150 giving the sleeving assembly 840 the ability to fully drive 860 the surrounding sidewall 75 over the helically wound 360 flexible planar strip 345, clamshell element 150, and cover 370

920 Sleeving assembly 840 drawing away from the clamshell element 150 to release the completed container apparatus 50

DETAILED DESCRIPTION

Figure 1:
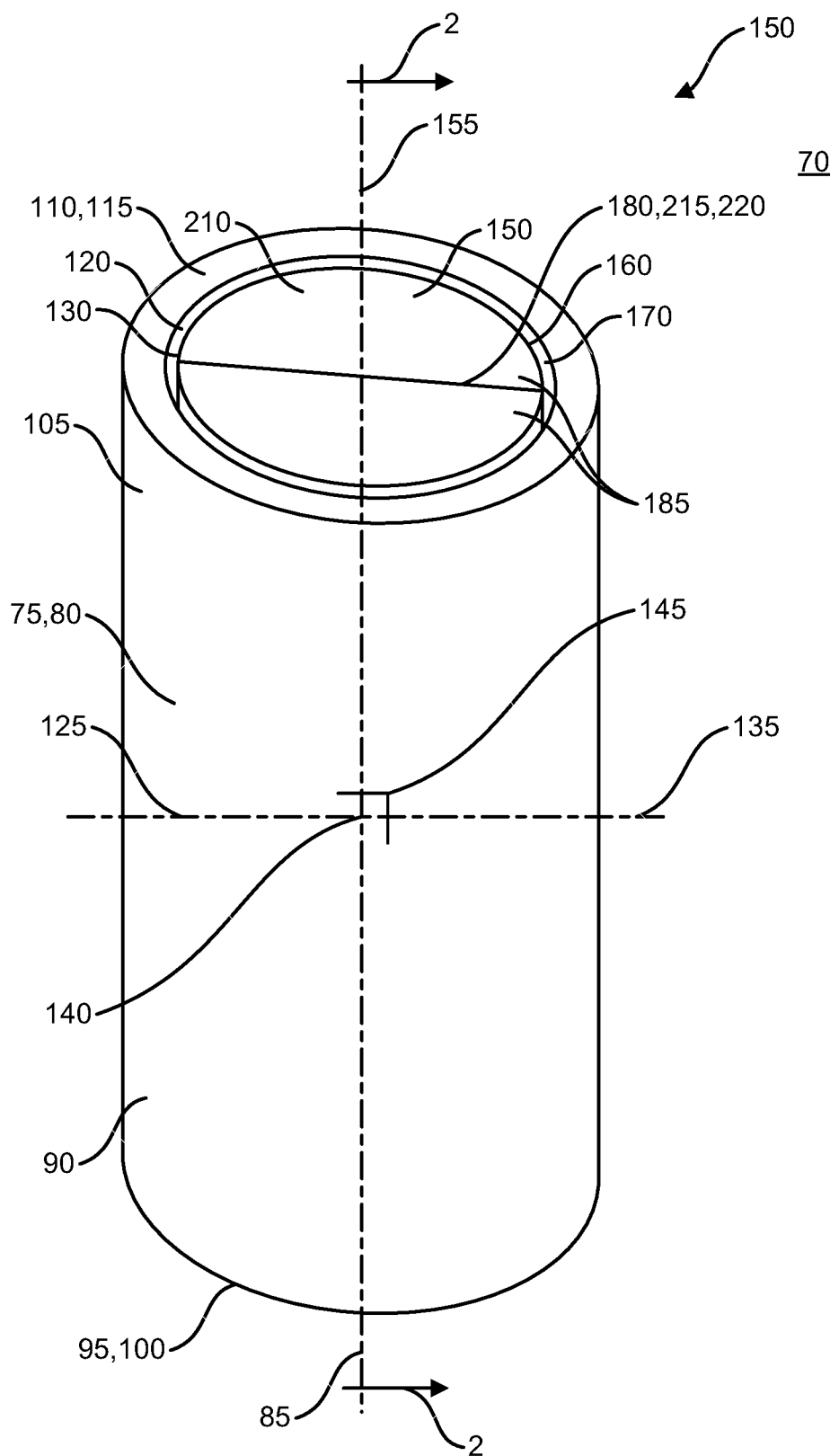
FIG. 1 shows a second end portion perspective view of the of the container apparatus including the external environment, the surrounding sidewall, the longitudinal axis, the first end portion, the second end portion, the second aperture, the second margin, the inner surface, the outer surface, the rotational axis at a mid-point that is perpendicular to the longitudinal axis, the clamshell element in the closed state, the slidable engagement of the clamshell element, the split boundary, and with the partial clamshell elements adjacent at the split boundary having a removable contact.

With initial reference to FIG. 1 shown is a second end portion 105 perspective view of the of the container apparatus 50 including the external environment 70, the surrounding sidewall 75, the longitudinal axis 85, the first end portion 90, the second end portion 105, the second aperture 110, the second margin 115, the inner surface 120, and the outer surface 125. Further, FIG. 1 shows the rotational axis 135 at a mid-point 140 that is perpendicular 145 to the longitudinal axis 85, plus the clamshell element 150 in the closed state 210, the slidable engagement 170 of the clamshell element 150, the split boundary 180, and with the partial clamshell elements 185 adjacent at the split boundary 180 having a removable contact 220.

Figure 2:
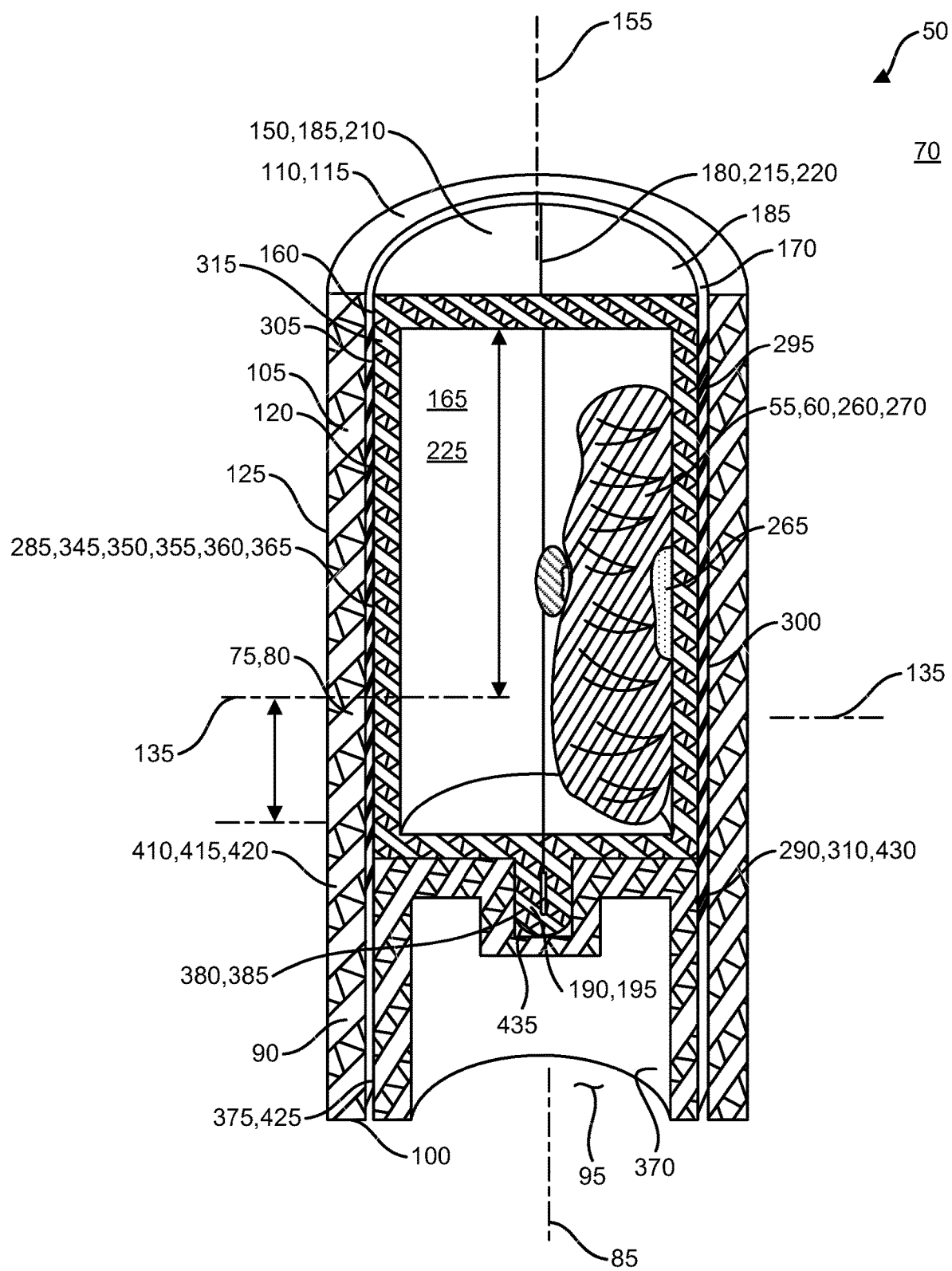
FIG. 2 shows cross sectional view 2-2 from FIG. 1, showing the entire container apparatus including the external environment, the surrounding sidewall, the longitudinal axis, the first end portion, the first aperture, the first margin, the second end portion, the second aperture, the second margin, the inner surface, the outer surface, the rotational axis, the clamshell element in the closed state, the slidable engagement of the clamshell element, the split boundary, and with the partial clamshell elements adjacent at the split boundary having a removable contact with one another, the cover affixed to the first margin portion, a dome shape of the cover, an inward projection of the dome shaped cover toward the sidewall interior as the cover is disposed within a portion of the sidewall interior, affixment of a portion of the cover to the inner surface, a longwise axis of the clamshell element, the outer periphery, the inner void, the slidable engagement, a hinge, a mating protrusion of the hinge, a closed volume of the inner void, the article disposed as a poisoned bait within the inner void, affixment of the article to the inner void, the article isolated from the external environment, and a resting removable contact in the form of a removable engagement of the clamshell element at the hinge against the cover.

Next, FIG. 2 shows cross sectional view 2-2 from FIG. 1, showing the entire container apparatus 50 including the external environment 70, the surrounding sidewall 75, the longitudinal axis 85, the first end portion 90, the first aperture 95, the first margin 100, the second end portion 105, the second aperture 110, the second margin 115, the inner surface 120, the outer surface 125, the rotational axis 135. FIG. 2 also shows the clamshell element 150 in the closed state 210, the slidable engagement 170 of the clamshell element 150, the split boundary 180, and with the partial clamshell elements 185 adjacent 215 at the split boundary 180 having a removable contact 220 with one another.

Further, FIG. 2 also shows the cover 370 affixed 375 to the first margin portion 100, a dome shape 410 of the cover 370, an inward projection 415 of the dome shaped 410 cover 370 toward the sidewall interior 130 as the cover 370 is disposed 420 within a portion of the sidewall interior 130, affixment 425 of a portion of the cover 370 to the inner surface 120. Also shown in FIG. 2 is the a longwise axis 155 of the clamshell element 150, the outer periphery 160, the inner void 165, the slidable engagement 170, a hinge 190, a mating protrusion 195 of the hinge 190, a closed volume 225 of the inner void 165, with the article 55 disposed as a poisoned bait 60 within the inner void 165, and affixment of the article 55 to the inner void 165. With FIG. 2 showing the article 55 isolated from the external environment 70, and a resting removable contact 380 in the form of a removable engagement 385 of the clamshell element 150 at the hinge 190 against the cover 370.

Figure 3:
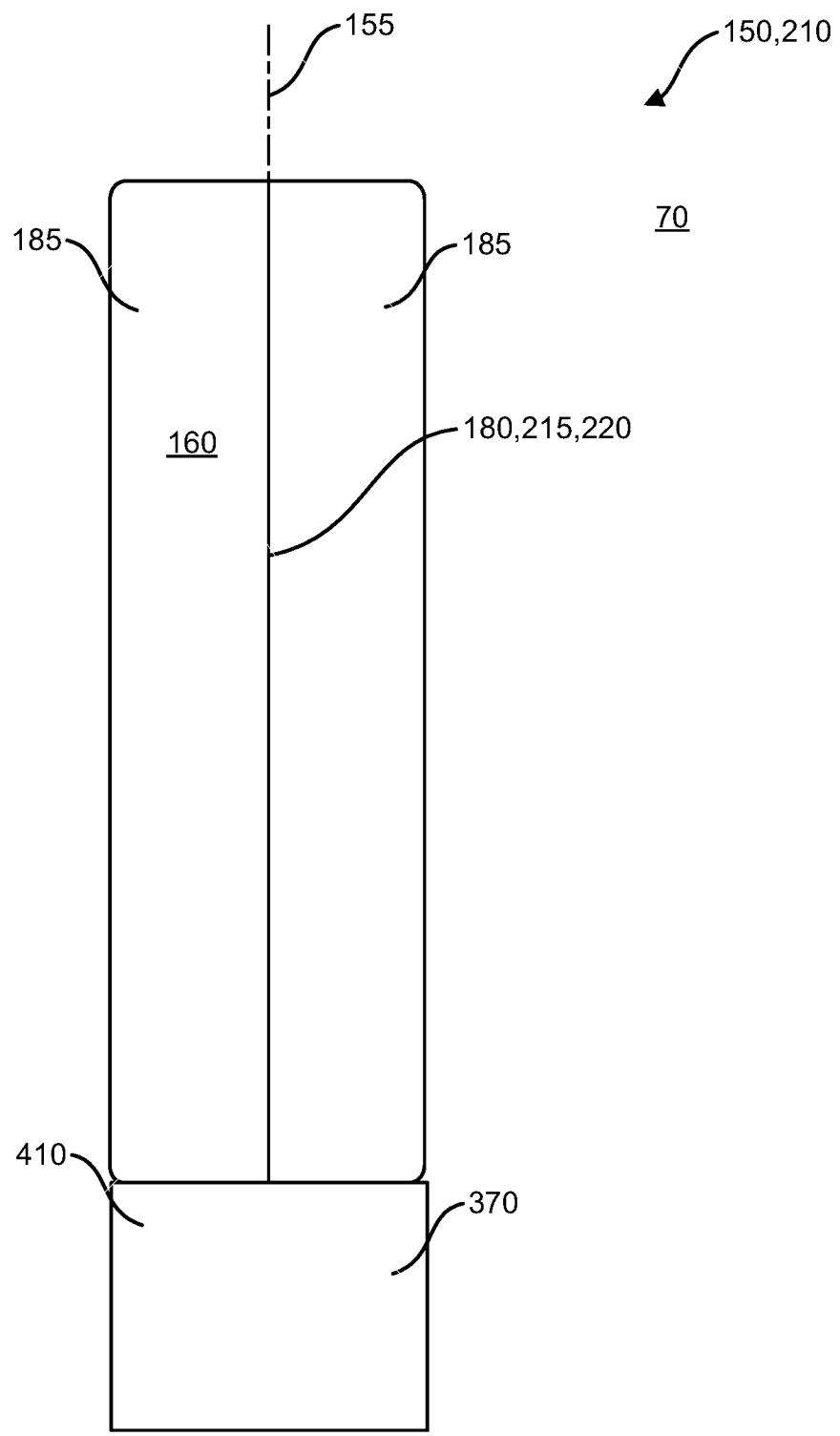
FIG. 3 shows a side elevation view of the clamshell element in the closed state with the resting removable contact in the form of the removable engagement of the clamshell element at the hinge against the cover with the surrounding sidewall removed, also shown is the split boundary with the partial clamshell elements adjacent at the split boundary having a removable contact with one another, and the longwise axis.

Next, FIG. 3 shows a side elevation view of the clamshell element 150 in the closed state 210 with the resting removable contact 380 in the form of the removable engagement 385 of the clamshell element 150 at the hinge 190 against the cover 370 with the surrounding sidewall 75 removed, also shown is the split boundary 180 with the partial clamshell elements 185 adjacent 215 at the split boundary 180 having a removable contact 220 with one another, and the longwise axis 155.

Figure 4:
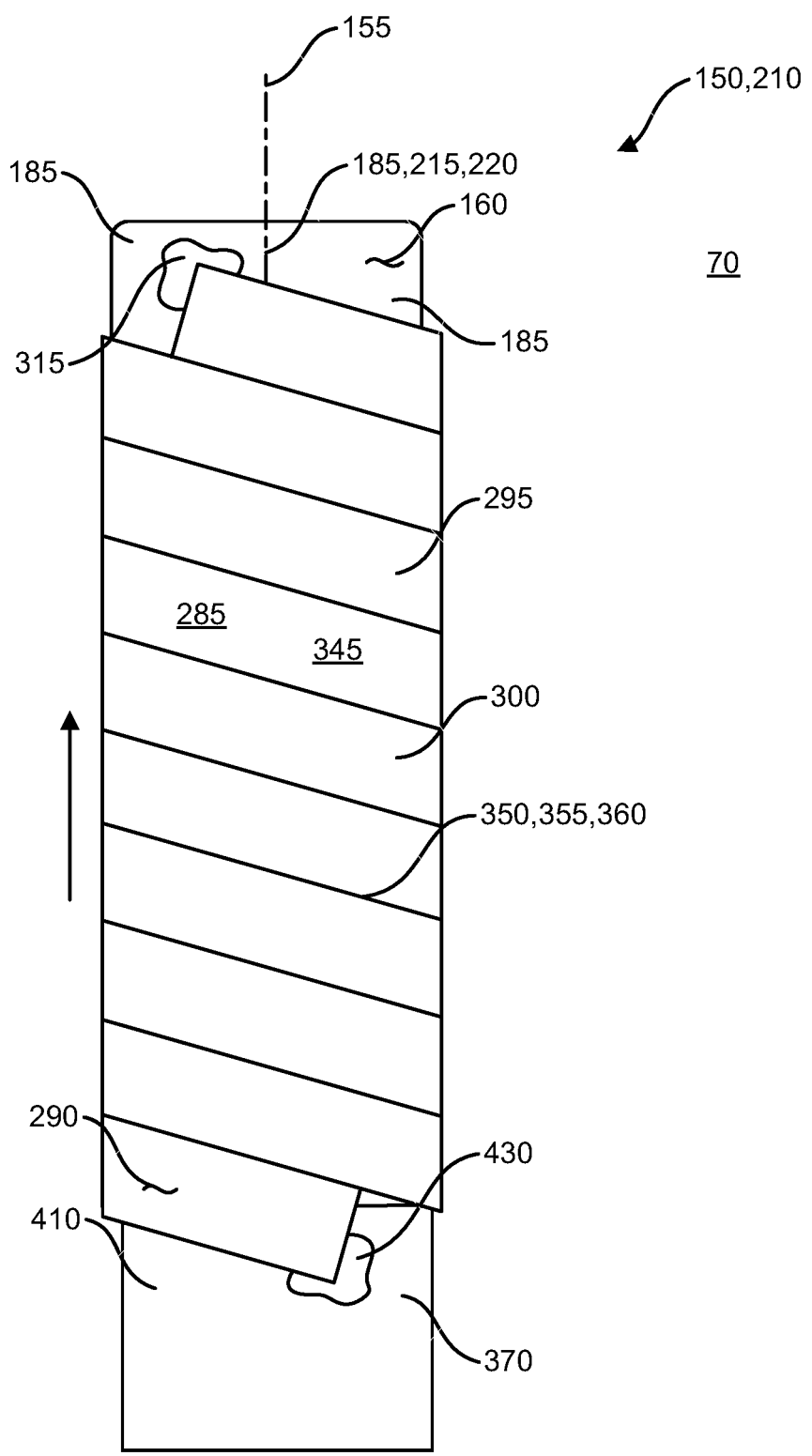
FIG. 4 shows the side elevation view of the clamshell element in the closed state with the resting removable contact in the form of the removable engagement of the clamshell element at the hinge against the cover with the surrounding sidewall removed, also shown is the split boundary with the partial clamshell elements adjacent at the split boundary having a removable contact with one another, and the longwise axis all as depicted in FIG. 3 with the addition of an elongated flexible member in the form of a planar strip that includes a primary end portion, a secondary end portion, a mid-portion of the elongated flexible member, affixment of the primary end portion to the cover, affixment of the secondary end portion to the clamshell element, and a wound form of a helical spiral of the elongated flexible member about the outer periphery in a direction from the secondary end portion of the planar strip to the primary end portion of the planar strip.

Continuing, FIG. 4 shows the side elevation view of the clamshell element 150 in the closed state 210 with the resting removable contact 380 in the form of the removable engagement 385 of the clamshell element 150 at the hinge 190 against the cover 370 with the surrounding sidewall removed 75, also shown is the split boundary 180 with the partial clamshell elements 185 adjacent 215 at the split boundary 180 having a removable contact 220 with one another, and the longwise axis 155 all as depicted in FIG. 3. Thus, FIG. 4 has the addition of an elongated flexible member 285 in the form of a planar strip 345 that includes a primary end portion 290, a secondary end portion 295, a mid-portion 300 of the elongated flexible member 285, affixment 430 of the primary end portion 290 to the cover 370, affixment 315 of the secondary end portion 295 to the clamshell element 150. Also, FIG. 4 shows a wound form 350 of a helical 360 spiral 355 of the elongated flexible member 285 about the outer periphery 160 in a direction from the secondary end portion 295 to the primary end portion 290.

Figure 5:
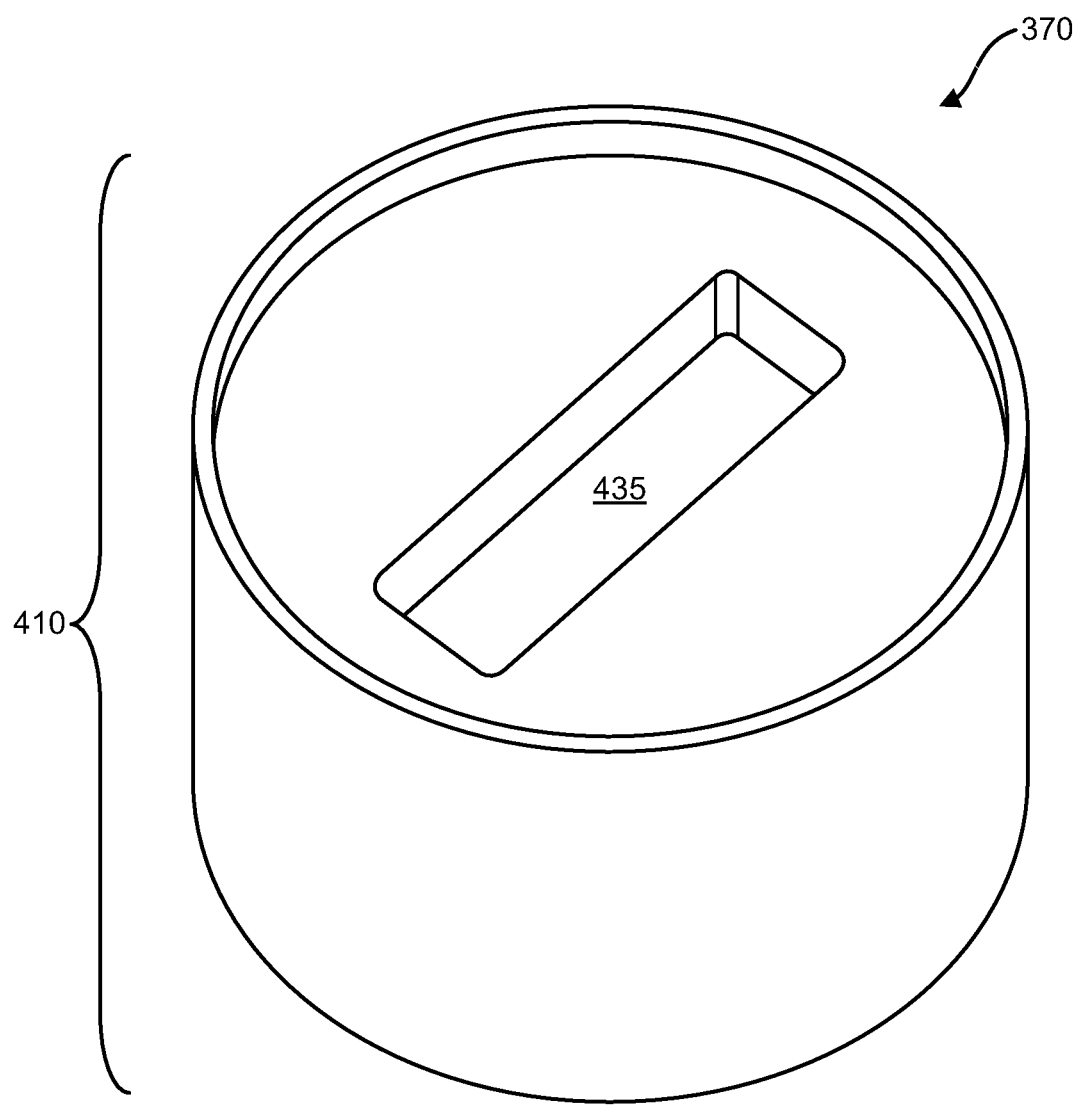
FIG. 5 shows a perspective view of the cover and in particular a cavity disposed within the cover, and the dome shape of the cover.
Figure 6:
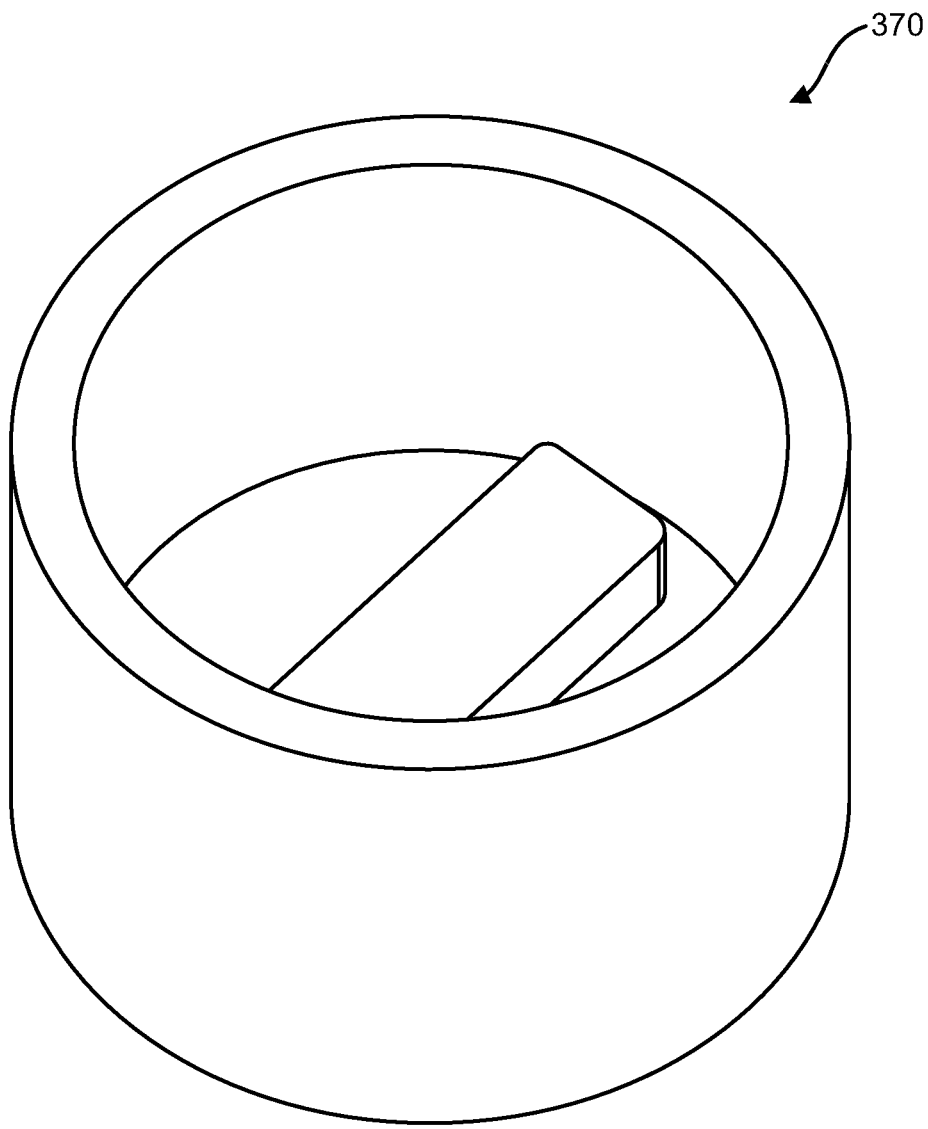
FIG. 6 shows a perspective view of the cover that is opposing to FIG. 5, and in particular the dome shape of the cover.
Figure 7:
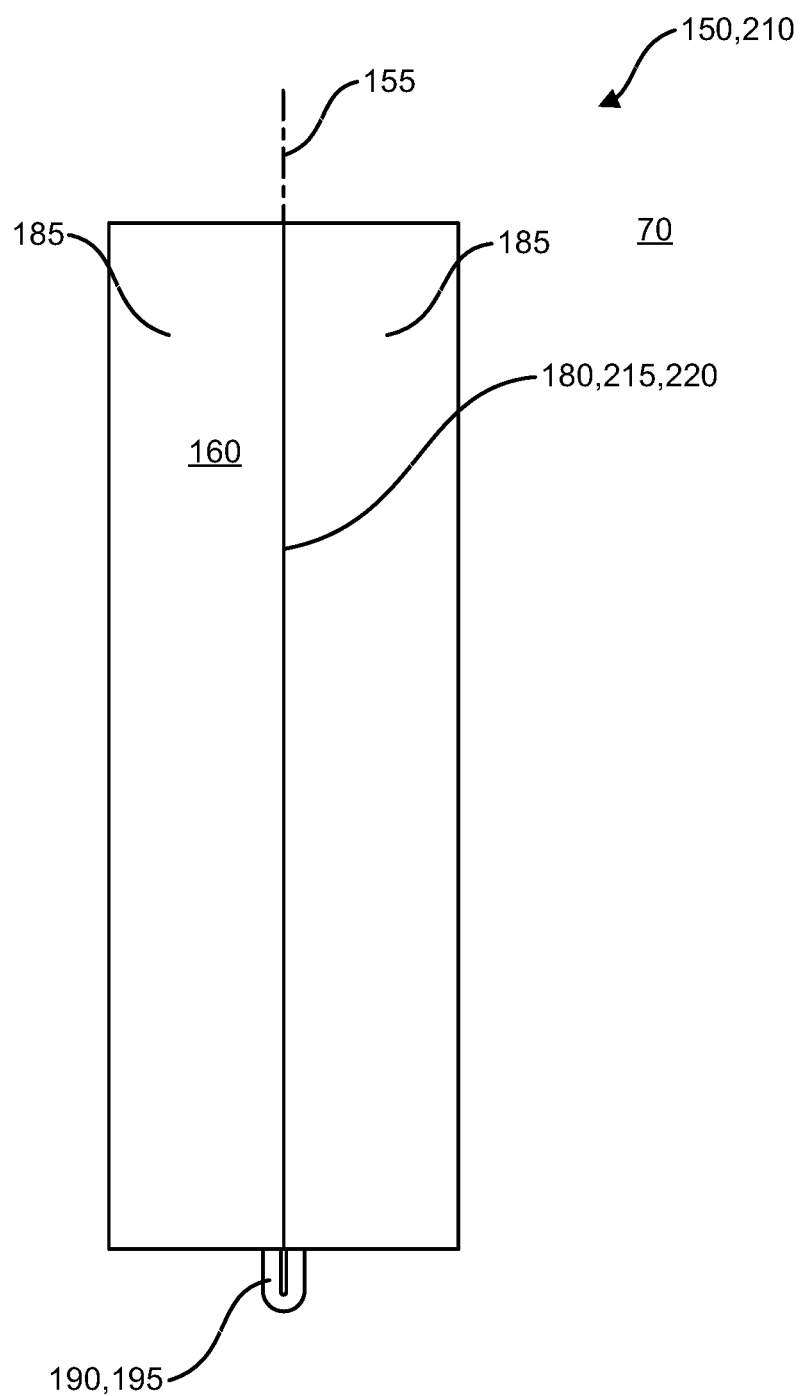
FIG. 7 shows a side elevation view of the clamshell element in the closed state with the surrounding sidewall removed, also shown is the split boundary with the partial clamshell elements adjacent at the split boundary having a removable contact with one another, the hinge, the mating protrusion of the hinge, and the longwise axis.

Further, FIG. 5 shows a perspective view of the cover 370 and in particular a cavity 435 disposed within the cover 370, and the dome shape 410 of the cover 370 and FIG. 6 shows a perspective view of the cover 370 that is opposing to FIG. 5, and in particular the dome shape 410 of the cover 370. Continuing, FIG. 7 shows a side elevation view of the clamshell element 150 in the closed state 210 with the surrounding sidewall 75 removed, also shown is the split boundary 180 with the partial clamshell elements 185 adjacent 215 at the split boundary 180 having a removable contact 220 with one another, the hinge 190, the mating protrusion 195 of the hinge 190, and the longwise axis 155.

Next, FIG. 8 shows a perspective view of the clamshell element 150 in the open state 230 with the surrounding sidewall 75 removed, also shown is the split boundary 180 with the partial clamshell elements 185 apart from one another at the split boundary 180, the hinge 190, the mating protrusion 195 of the hinge 190, the first pivotal axis 200 of the hinge 190, a perpendicular relationship 205 of the longwise axis 155 and the first pivotal axis 200, and the longwise axis 155, wherein the article 55 that is disposed within the inner void 165 being exposed to the external environment 70.

Figure 9:
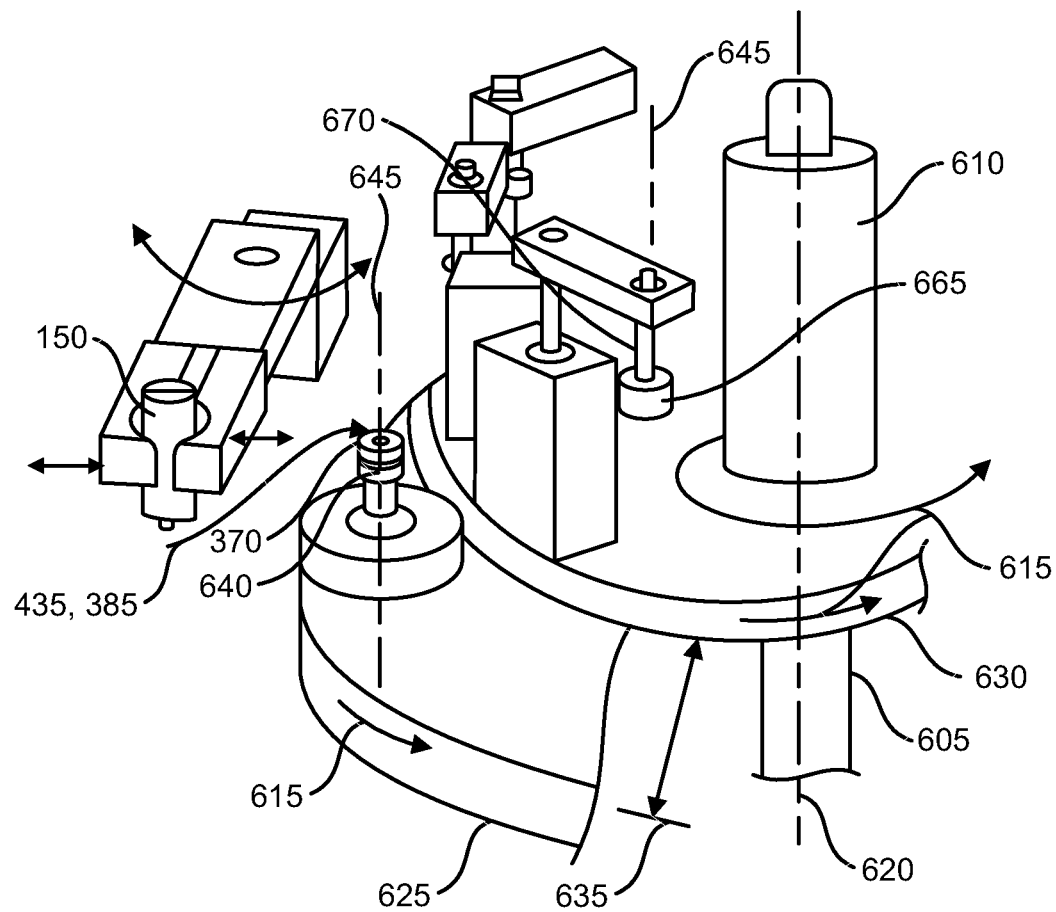
FIG. 9 shows a perspective view of the manufacturing apparatus showing in particular a spindle, a spindle rotation and an axis, primary and secondary radially extending platforms, further primary and secondary cradles, a cradle axis, plus the clamshell element and cover, with the cover disposed upon the primary cradle, wherein the clamshell element is about to be placed upon the cover.

Continuing, FIG. 9 shows a perspective view of the manufacturing apparatus 600 showing in particular a base structure 605, a spindle 610, a spindle rotation 615, and a spindle axis 620, also primary 625 and secondary 630 radially extending platforms, further shown are primary 640 and secondary 665 cradles, a cradle axis 645, plus the clamshell element 150 and cover 370, with the cover 370 disposed upon the primary cradle 640. Wherein in FIG. 9 the clamshell element 150 is about to be placed upon the cover 370.

Figure 10:
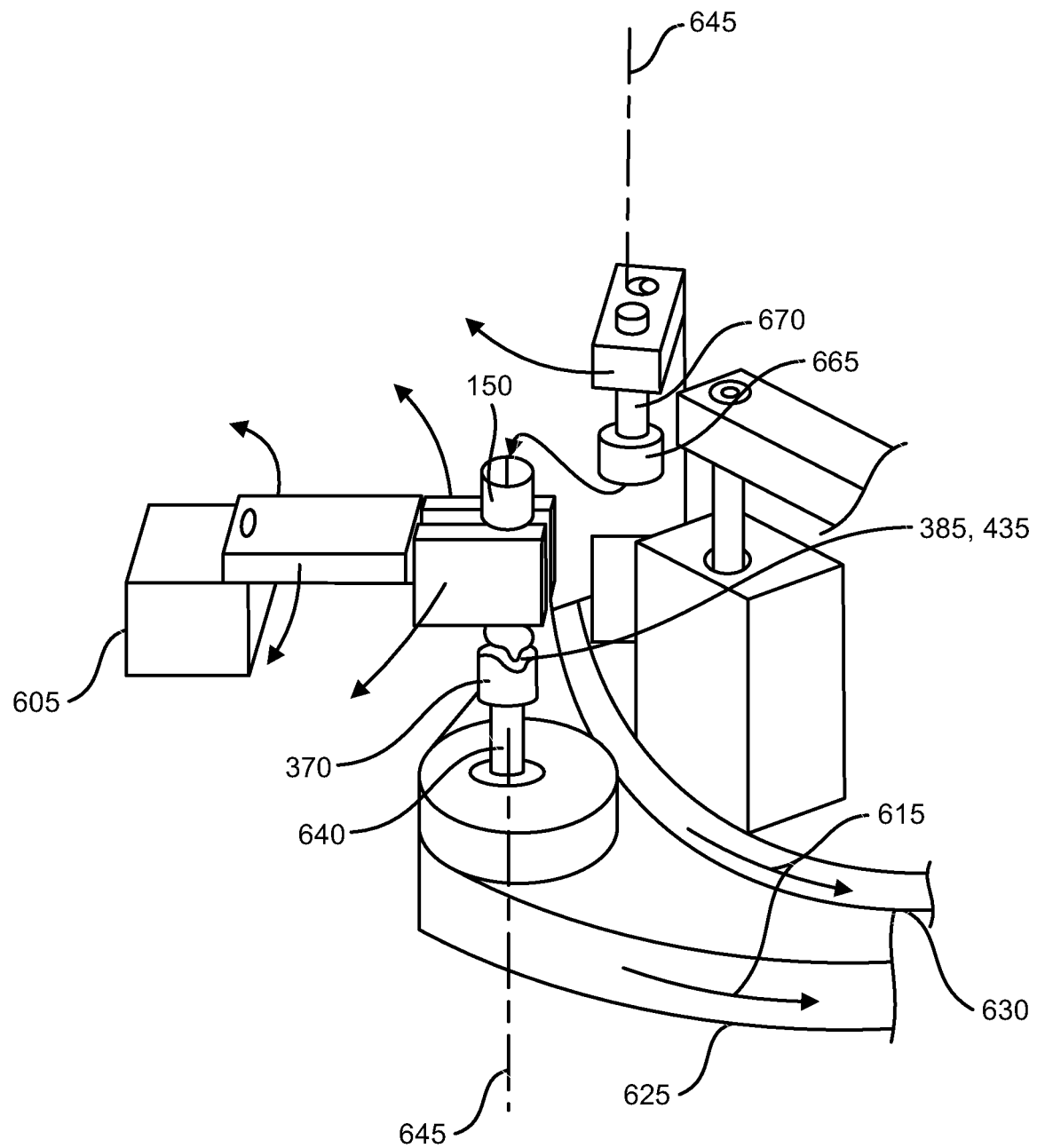
FIG. 10 shows a perspective view of the manufacturing apparatus showing in particular the clamshell element is placed upon the cover, also showing the primary and secondary radially extending platforms, further the primary and secondary cradles, the cradle axis, plus the clamshell element and cover, with the cover disposed upon the primary cradle.

Next, FIG. 10 shows a perspective view of the manufacturing apparatus 600 showing in particular the clamshell element 150 being placed upon the cover 370, also showing the primary 625 and secondary 630 radially extending platforms, further the primary 640 and secondary 665 cradles, the cradle axis 645, plus the clamshell element 150 and cover 370, with the cover 370 disposed upon the primary cradle 640.

Figure 11:
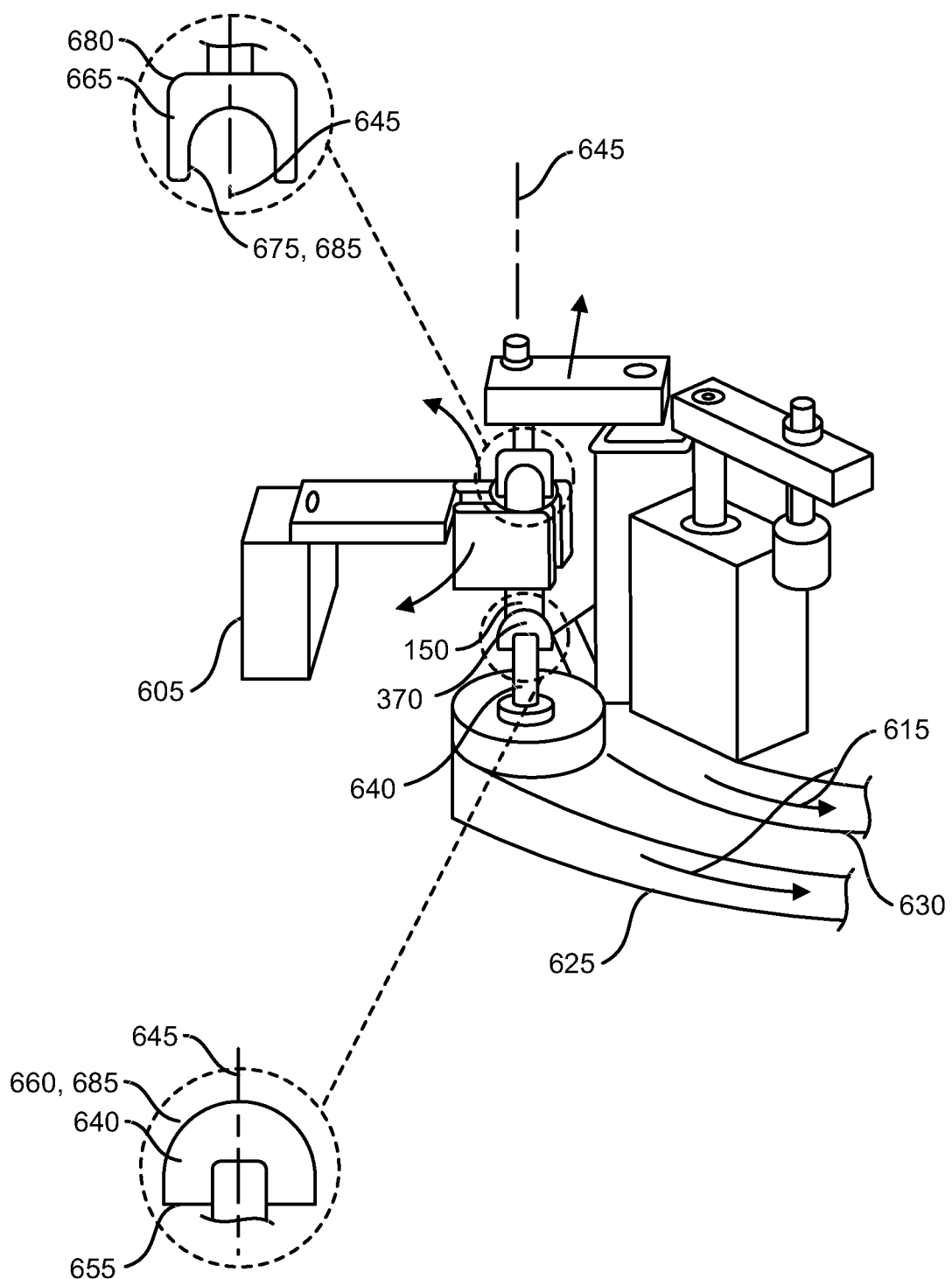
FIG. 11 shows a perspective view of the manufacturing apparatus showing in particular the clamshell element being placed upon the cover, also showing the secondary cradle positioned in place upon the clamshell element opposite the cover side, thus resulting in the primary and secondary cradles supporting the cover and clamshell element, detail is also shown on the primary cradle convex and concave portions, plus on the secondary cradle convex and concave portions and their relation to the primary cradle concave and convex portions.

Moving ahead, FIG. 11 shows a perspective view of the manufacturing apparatus 600 showing in particular the clamshell element 150 being placed upon the cover 370, also showing the secondary cradle 665 positioned in place upon the clamshell element 150 opposite the cover side 370, thus resulting in the primary 640 and secondary 665 cradles supporting the cover 370 and clamshell element 150, detail is also shown on the primary cradle 640 convex 660 and concave 655 portions, plus on the secondary cradle 665 convex 680 and concave 675 portions and their positional relation 685 to the primary cradle 640 concave 655 and convex 660 portions with the two removed views.

Figure 12:
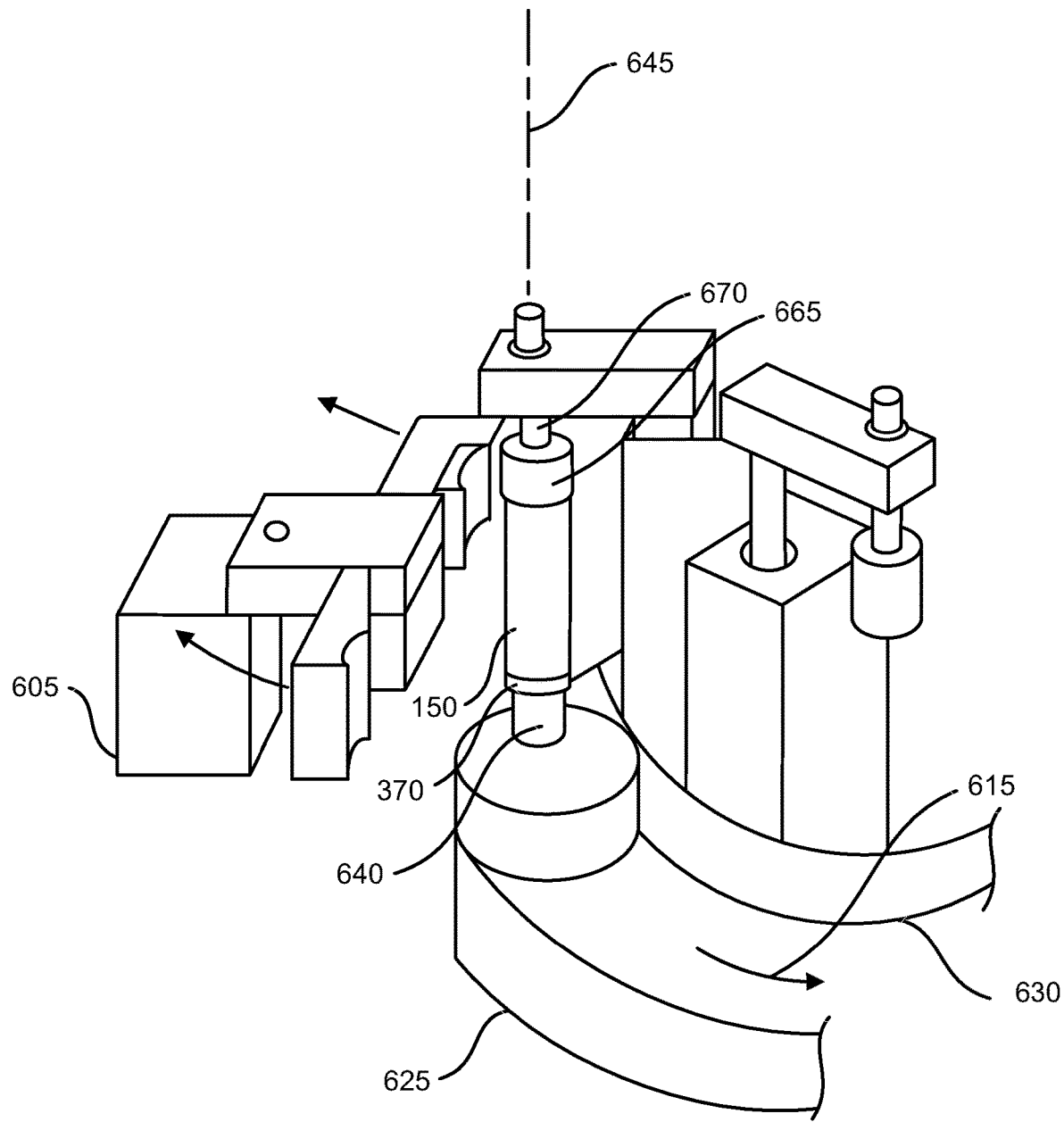
FIG. 12 shows a perspective view of the manufacturing apparatus showing in particular the clamshell element being placed upon the cover, also showing the secondary cradle positioned in place upon the clamshell element opposite the cover side, thus resulting in the primary and secondary cradles supporting the cover and clamshell element respectively.

Further, FIG. 12 shows a perspective view of the manufacturing apparatus 600 showing in particular the clamshell element 150 being placed upon the cover 370, also showing the secondary cradle 665 positioned in place upon the clamshell element 150 opposite the cover side 370, thus resulting in the primary 640 and secondary 665 cradles supporting the cover 370 and clamshell element 150 respectively.

Figure 13:
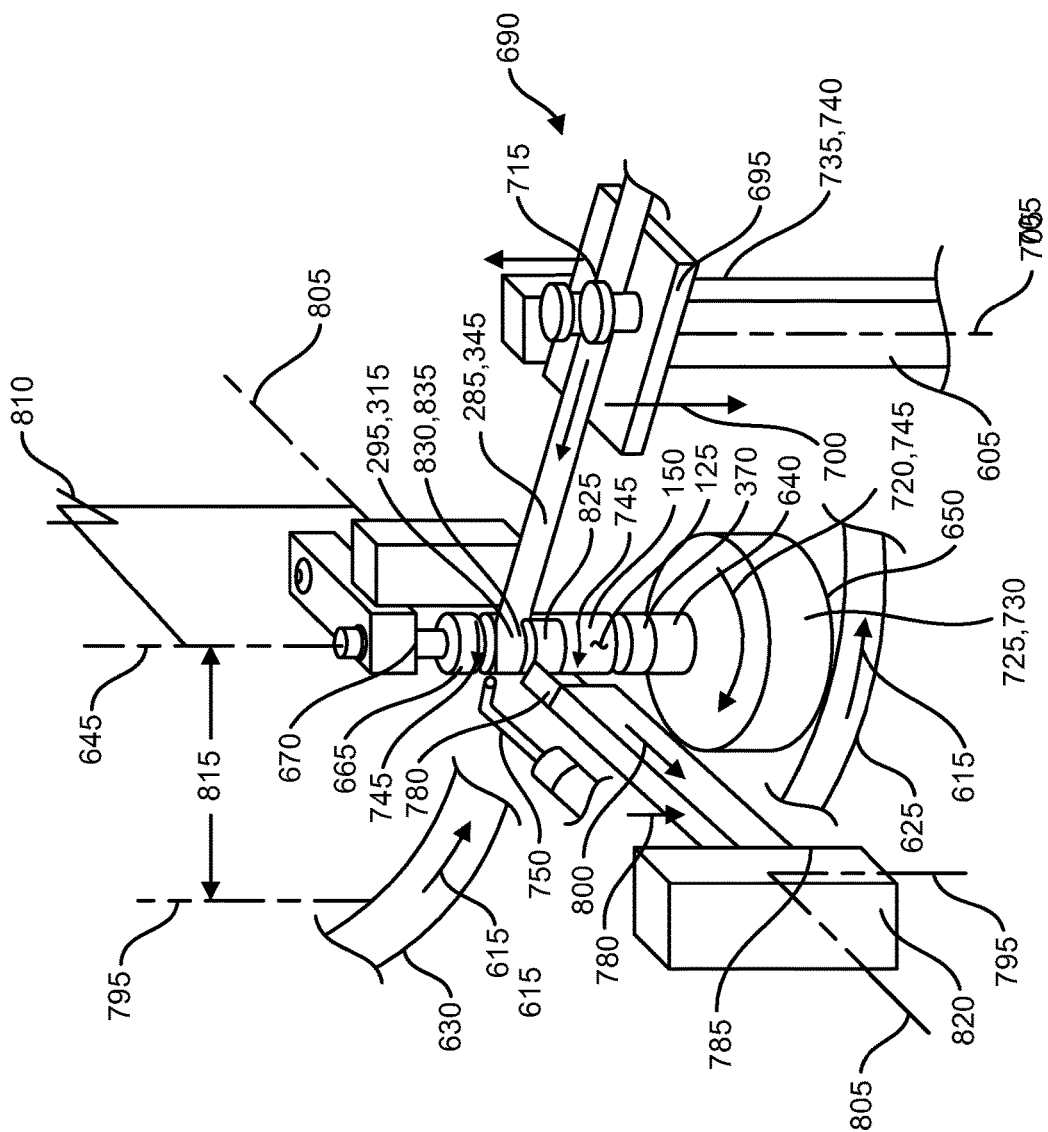
FIG. 13 shows a perspective view of the manufacturing apparatus showing in particular the clamshell element being placed upon the cover, also showing the secondary cradle positioned in place upon the clamshell element opposite the cover side, thus resulting in the primary and secondary cradles supporting the cover and clamshell element respectively on the cradle axis, in addition shown is a flexible planar strip in place on the outer periphery of the clamshell element held in place by the holding and cutting head in conjunction with a arcuate finger element nesting the flexible planar strip about the cradle axis as adjacent to the outer periphery of the clamshell element, with the flexible planar strip being affixed to the clamshell element outer periphery by a valved adhesive nozzle, also the flexible planar strip is guided by a guide assembly which by the unitary rotational movement of the primary and secondary cradles, clamshell element, and cover are operational to progressively helically wrap the flexible planar strip around the clamshell element and cover essentially going from the secondary cradle to the primary cradle.

Continuing, FIG. 13 shows a perspective view of the manufacturing apparatus 600 showing in particular the clamshell element 150 being placed upon the cover 370, also showing the secondary cradle 665 positioned in place upon the clamshell element 150 opposite the cover side 370, thus resulting in the primary 640 and secondary 665 cradles supporting the cover 370 and clamshell element 150 respectively on the cradle axis 645. In addition shown in FIG. 13 is a flexible planar strip 345 in place on the outer periphery 160 of the clamshell element 150 held in place by the holding and cutting head 780 in conjunction with a arcuate finger element 825 nesting 835 the flexible planar strip 345 about the cradle axis 645 as adjacent to the outer periphery 160 of the clamshell element 150, with the flexible planar strip 345 being affixed 315 to the clamshell element 150 outer periphery 160 by a valved adhesive nozzle 750. Also, FIG. 13 shows the flexible planar strip 345 that is guided by a guide assembly 690 which by the unitary rotational movement 720, 745 of the primary 640 and secondary 665 cradles, clamshell element 150, and cover 370 are operational to progressively helically wrap 350, 355, 360 the flexible planar strip 345 around the clamshell element 150 and cover 370 essentially going from the secondary cradle 665 to the primary cradle 640.

Figure 14:
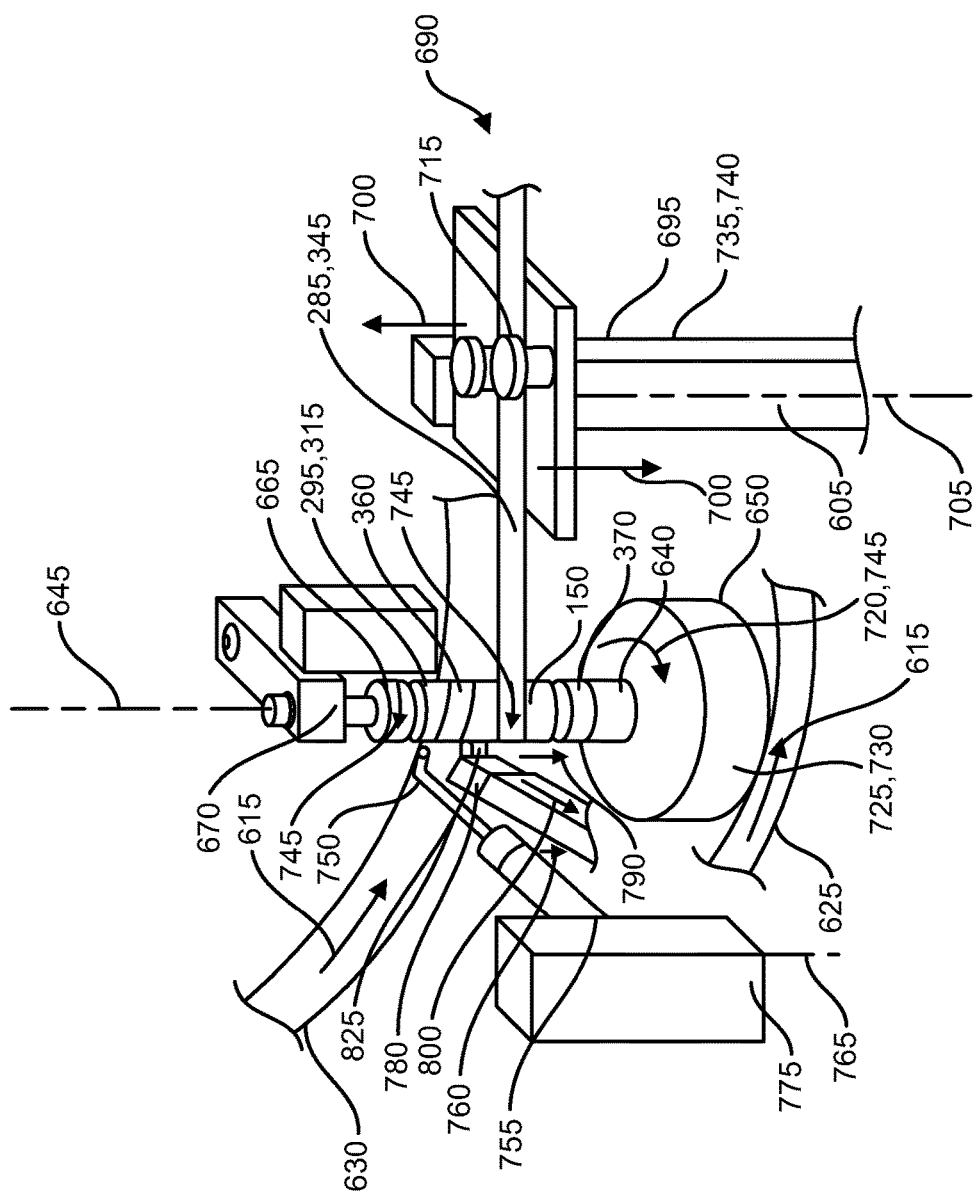
FIG. 14 shows a perspective view of the manufacturing apparatus showing in particular the clamshell element being placed upon the cover, also showing the secondary cradle positioned in place upon the clamshell element opposite the cover side, thus resulting in the primary and secondary cradles supporting the cover and clamshell element respectively on the cradle axis, in addition shown is the flexible planar strip helically progressing from starting in FIG. 13 in wrapping around the clamshell element from the secondary cradle toward the primary cradle via the rotation in unison of the primary and secondary cradles and the clamshell element and cover. Also shown in FIG. 14 is the sliding movement on the valved adhesive nozzle, the cutting and holding head, and the guide assembly that track and follow the flexible planar strip in going from the secondary cradle to the primary cradle, further the cutting and holding head also has reciprocating movement to pull away from the clamshell element during the flexible planar strip helical winding process.

Moving onward, FIG. 14 shows a perspective view of the manufacturing apparatus 600 showing in particular the clamshell element 150 being placed upon the cover 370, also showing the secondary cradle 665 positioned in place upon the clamshell element 150 opposite the cover side 370, thus resulting in the primary 640 and secondary 665 cradles supporting the cover 370 and clamshell element 150 respectively on the cradle axis 645, in addition shown is the flexible planar strip 345 helically progressing 350, 355, 360 from starting in FIG. 13 in wrapping around the clamshell element 150 from the secondary cradle 665 toward the primary cradle 640 via the rotation in unison 720,745 of the primary 640 and secondary 665 cradles and the clamshell element 150 and cover 370. Also, shown in FIG. 14 is the sliding movement on the valved adhesive nozzle 750 sliding movement 760, the cutting and holding head 780 sliding movement 790, and the guide assembly 690 sliding movement 700 that track and follow the flexible planar strip 345 in going from the secondary cradle 665 to the primary cradle 640, further the cutting and holding head 780 also has reciprocating movement 800 to pull away from the clamshell element 150 during the flexible planar strip 345 helical winding process 350, 355, and 360.

Figure 15:
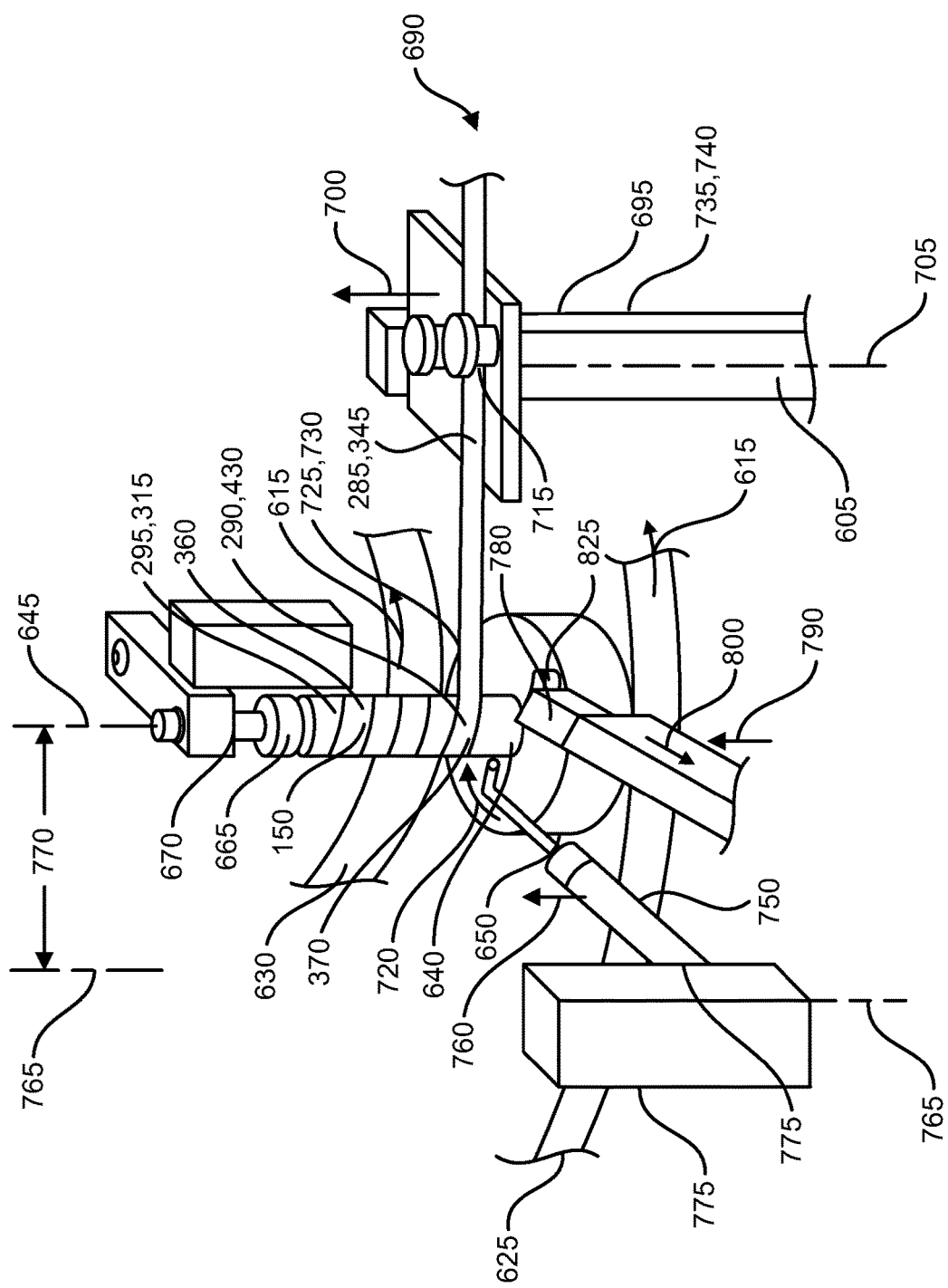
FIG. 15 shows a perspective view of the manufacturing apparatus showing in particular the clamshell element being placed upon the cover, also showing the secondary cradle positioned in place upon the clamshell element opposite the cover side, thus resulting in the primary and secondary cradles supporting the cover and clamshell element respectively on the cradle axis, in addition shown is the flexible planar strip with a completed helically progression from starting in FIG. 13, continuing in FIG. 14, and then completing in FIG. 15, in wrapping around the clamshell element and the cover from the secondary cradle toward the primary cradle via the rotation in unison of the primary and secondary cradles and the clamshell element and cover. Also shown in FIG. 15 is the continued sliding movement on the valved adhesive nozzle, the cutting and holding head, and the guide assembly that track and follow the flexible planar strip in going from the secondary cradle to the primary cradle, further the cutting and holding head also has reciprocating movement to pull away from the clamshell element during the flexible planar strip helical winding process.

Further, FIG. 15 shows a perspective view of the manufacturing apparatus 600 showing in particular the clamshell element 150 being placed upon the cover 370, also showing the secondary cradle 665 positioned in place upon the clamshell element 150 opposite the cover side 370, thus resulting in the primary 640 and secondary 665 cradles supporting the cover 370 and clamshell element 150 respectively on the cradle axis 645. In addition, shown in FIG. 15 is the flexible planar strip 345 with a completed helical progression 350, 355, and 360 from starting in FIG. 13, continuing in FIG. 14, and then completing in FIG. 15, in wrapping around the clamshell element 150 and the cover 370 from the secondary cradle 665 toward the primary cradle 640 via the rotation in unison 720, 745 of the primary 640 and secondary 665 cradles and the clamshell element 150 and cover 370. Also, shown in FIG. 15 is the continued sliding movement on the valved adhesive nozzle 750, the cutting and holding head 780, and the guide assembly 690 that track and follow the flexible planar strip 345 in going from the secondary cradle 665 to the primary cradle 640, further the cutting and holding head 780 also has reciprocating movement 800 to pull away from the clamshell element 150 during the flexible planar strip 345 helical winding process 350, 355, and 360.

Figure 16:
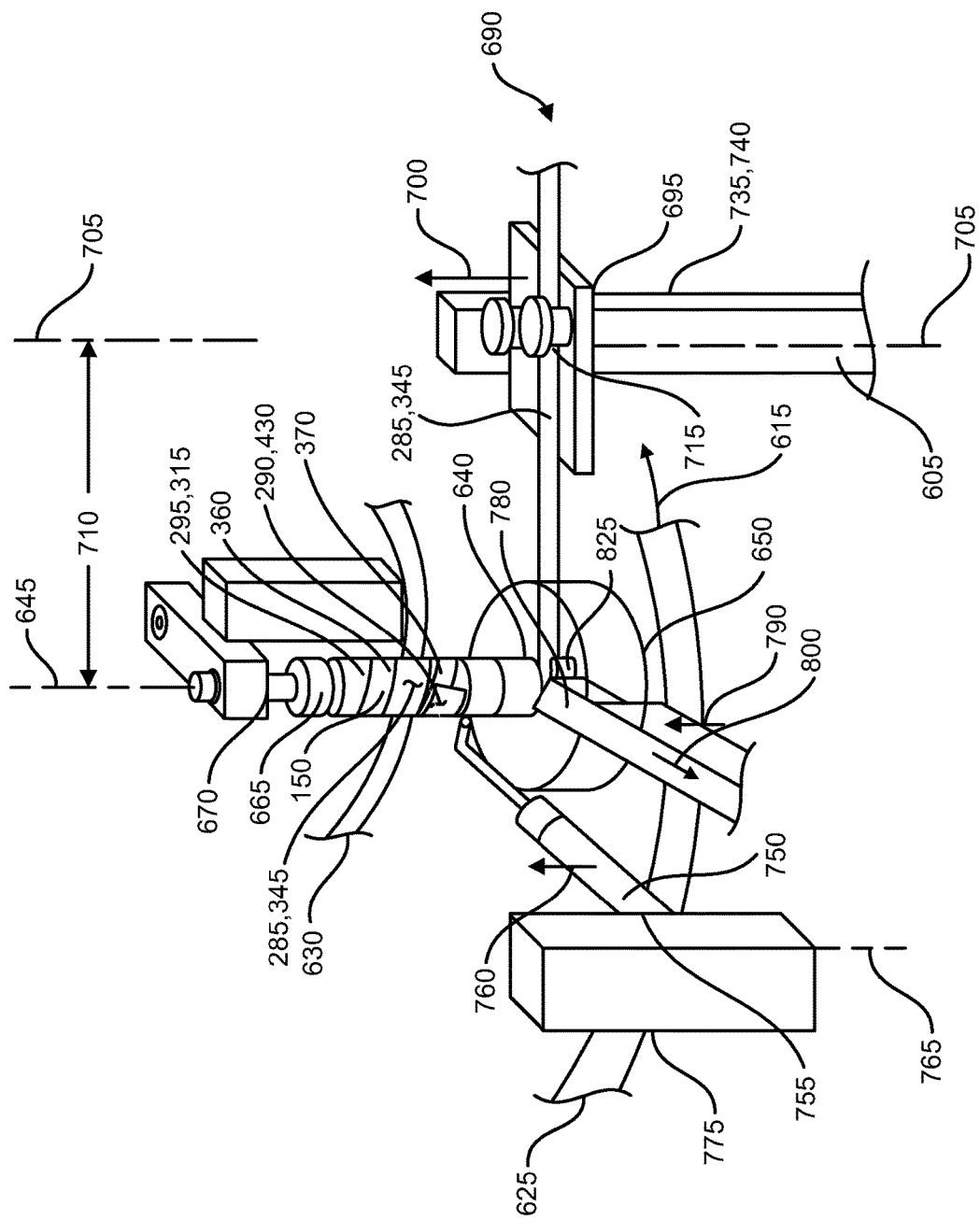
FIG. 16 shows a perspective view of the manufacturing apparatus showing in particular the clamshell element being placed upon the cover, also showing the secondary cradle positioned in place upon the clamshell element opposite the cover side, thus resulting in the primary and secondary cradles supporting the cover and clamshell element respectively on the cradle axis, in addition shown is the flexible planar strip with a completed helical progression from starting in FIG. 13, continuing in FIG. 14, and then completing in FIG. 15, in wrapping around the clamshell element and the cover from the secondary cradle toward the primary cradle via the rotation in unison of the primary and secondary cradles and the clamshell element and cover.

Next, FIG. 16 shows a perspective view of the manufacturing apparatus 600 showing in particular the clamshell element 150 being placed upon the cover 370, also showing the secondary cradle 665 positioned in place upon the clamshell element 150 opposite the cover side 370, thus resulting in the primary 640 and secondary 665 cradles supporting the cover 370 and clamshell element 150 respectively on the cradle axis 645. In addition, in FIG. 16 shown is the flexible planar strip 345 with a completed helical progression 350, 355, and 360 from starting in FIG. 13, continuing in FIG. 14, and then completing in FIG. 15, in wrapping around the clamshell element 150 and the cover 370 from the secondary cradle 665 toward the primary cradle 640 via the rotation 720, 745 in unison of the primary 640 and secondary 665 cradles and the clamshell element 150 and cover 370. In FIG. 16 the cutting and holding head 780 has cut the flexible planar strip 345 with the head holding and retracting 780 the flexible planar strip 345 away from the container apparatus 50 while the valved adhesive nozzle 750 has affixed the primary end portion 290 of the flexible planar strip 345 to the cover 370.

Figure 17:
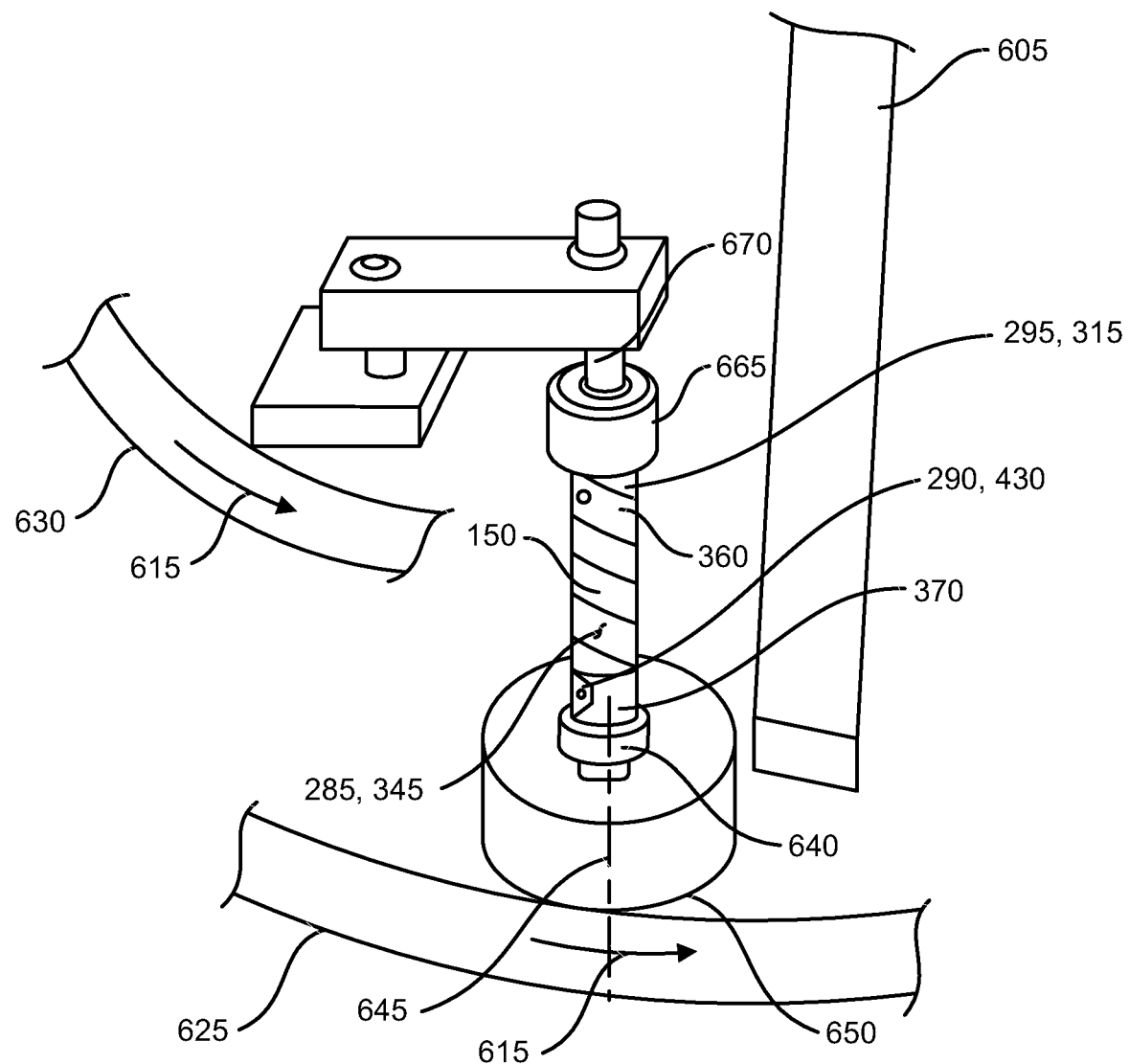

Further, FIG. 17 shows a perspective view of the manufacturing apparatus 600 showing in particular the clamshell element 150 and cover 370 with the completed and affixed flexible planar strip 345 having the helical progression 350, 355, and 360 as shown in FIGS. 13, 14, 15, and 16, wherein FIG. 17 shows rotation 615 of the spindle 610 in particular the primary radially extending platform 625 to move the clamshell element 150, cover 370, flexible planar strip 345, primary 640 and secondary 665 cradles thus clearing away from the valved adhesive nozzle 750, the cutting and holding head 780, and the guide assembly 690 to prepare for the sleeving operation to add the surrounding sidewall 75 of the container apparatus 50.

Figure 18:
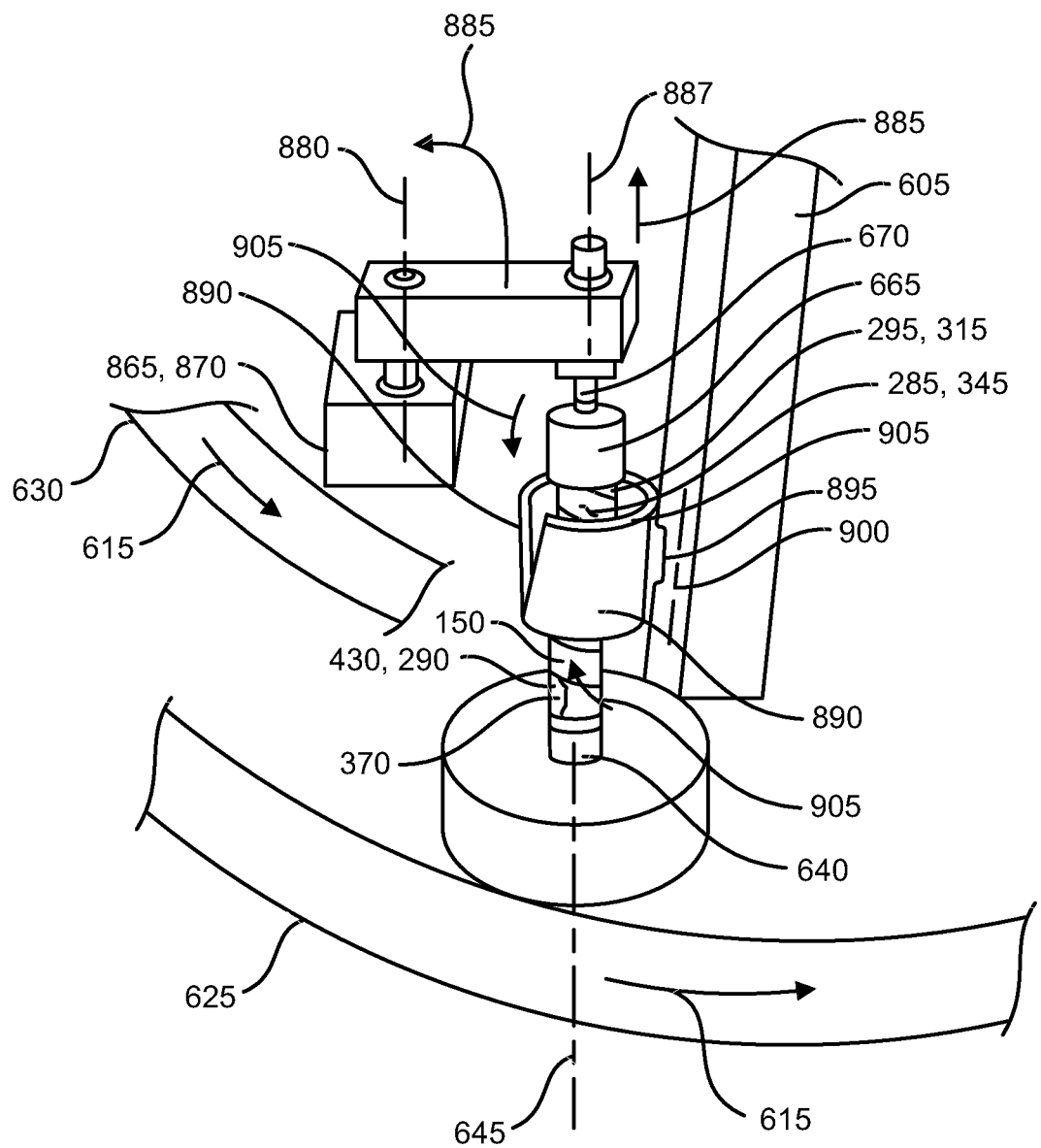
Figure 19:
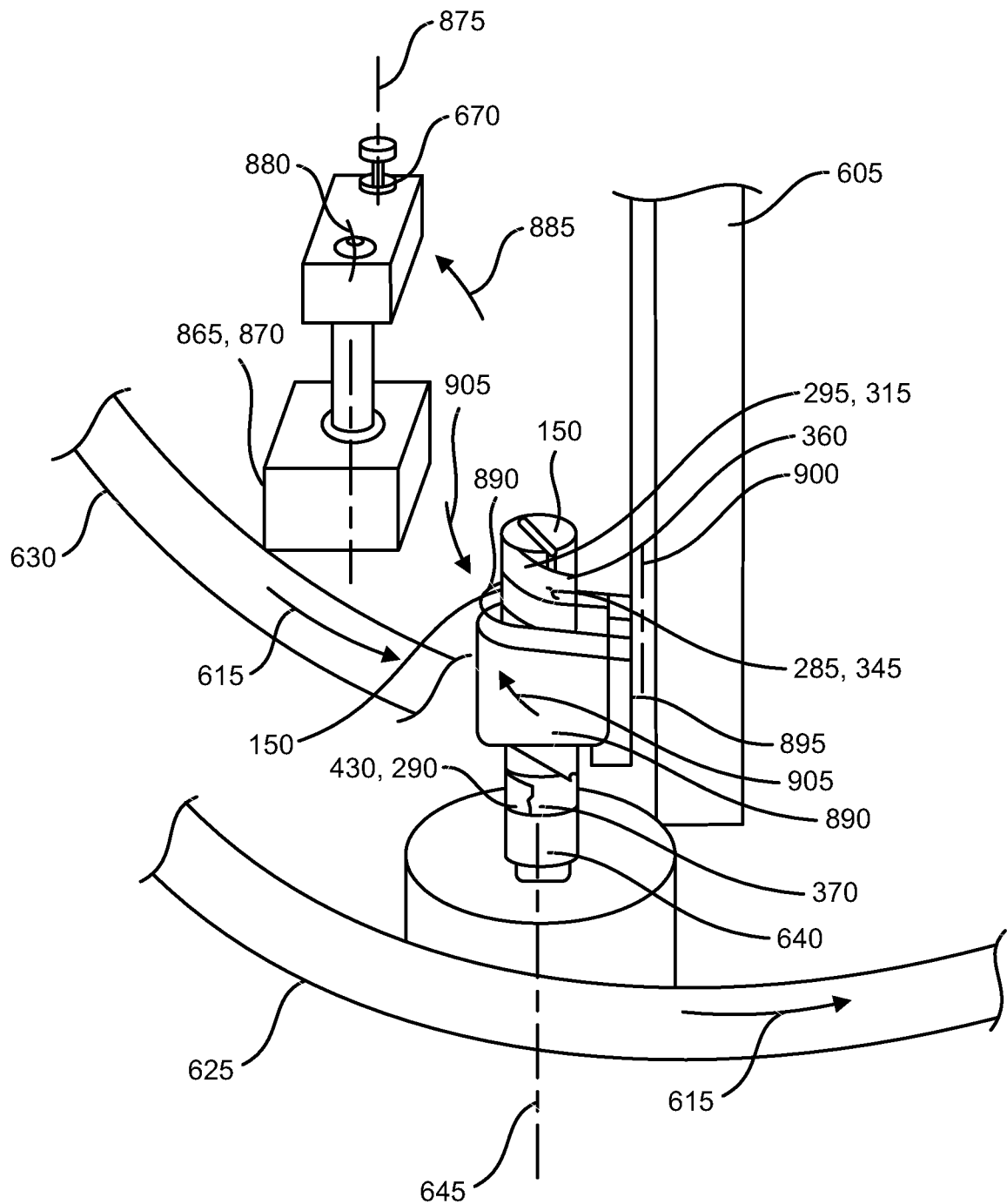

Continuing, FIG. 18 shows a perspective view of the manufacturing apparatus 600 showing in particular the clamshell element 150 and cover 370 with the completed and affixed flexible planar strip 345 having the helical progression 350, 355, and 360 as shown in FIGS. 13, 14, 15, 16, and 17, wherein FIG. 18 shows a split grasping clamp 890 through its pivotal attachment 895 to the base structure 605, with the split grasping clamp 890 then encompassing 905 the clamshell element 150, cover 370, and flexible planar strip 345 all together to facilitate a removing 885 of the secondary cradle 665 from the non hinge protrusion portion of the clamshell element 150, wherein the clamshell element 150, cover 370, and flexible planar strip 345 are all supported without the secondary cradle as shown in FIG. 19.

Further, FIG. 19 shows a perspective view of the manufacturing apparatus 600 showing in particular the clamshell element 150 and cover 370 with the completed and affixed flexible planar strip 345 having the helical progression 350, 355, and 360 as shown in FIGS. 13, 14, 15, 16, and 17, wherein FIG. 19 shows the split grasping clamp 890 through its pivotal attachment 895 to the base structure 605 encompassing 905 and supporting the clamshell element 150, cover 370, and flexible planar strip 345 all together, wherein the secondary cradle 665 is shown removed from the non hinge protrusion portion of the clamshell element 150, wherein the clamshell element 150, cover 370, flexible planar strip 345 are all supported about the cradle axis 645 without the secondary cradle 665 removed as shown to facilitate the sleeving operation.

Figure 20:
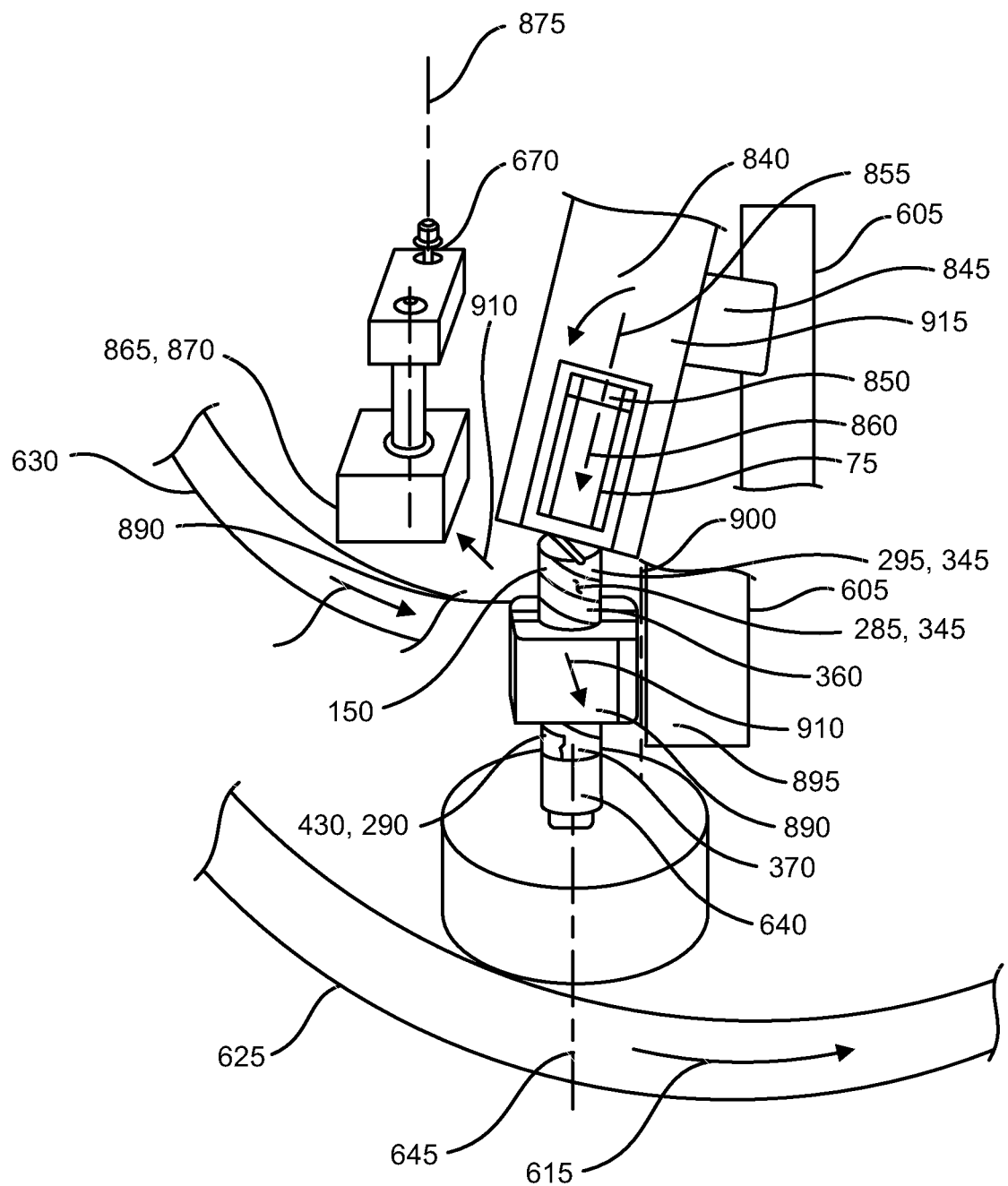

Next, FIG. 20 shows a perspective view of the manufacturing apparatus 600 showing in particular the clamshell element 150 and cover 370 with the completed and affixed flexible planar strip 345 having the helical progression 350, 355, and 360 as shown in FIGS. 13, 14, 15, 16, and 17, wherein FIG. 20 shows the split grasping clamp 890 through its pivotal attachment 895 to the base structure 605 encompassing 905 and supporting the clamshell element 150, cover 370, and flexible planar strip 345 all together. Wherein, FIG. 20 shows the secondary cradle 665 removed from the non hinge protrusion portion of the clamshell element 150, wherein the clamshell element 150, cover 370, flexible planar strip 345 are all supported about the cradle axis 645 without the secondary cradle 665 removed as shown to facilitate the sleeving operation that shows a sleeving assembly 840 positioned over 915 the clamshell element 150, the sleeving assembly 840 including a pivotal attachment 845 to the base structure 605, a reciprocating piston 850 having a reciprocating axis 855, and the surrounding sidewall 75 disposed within the sleeving assembly 840.

Figure 21:
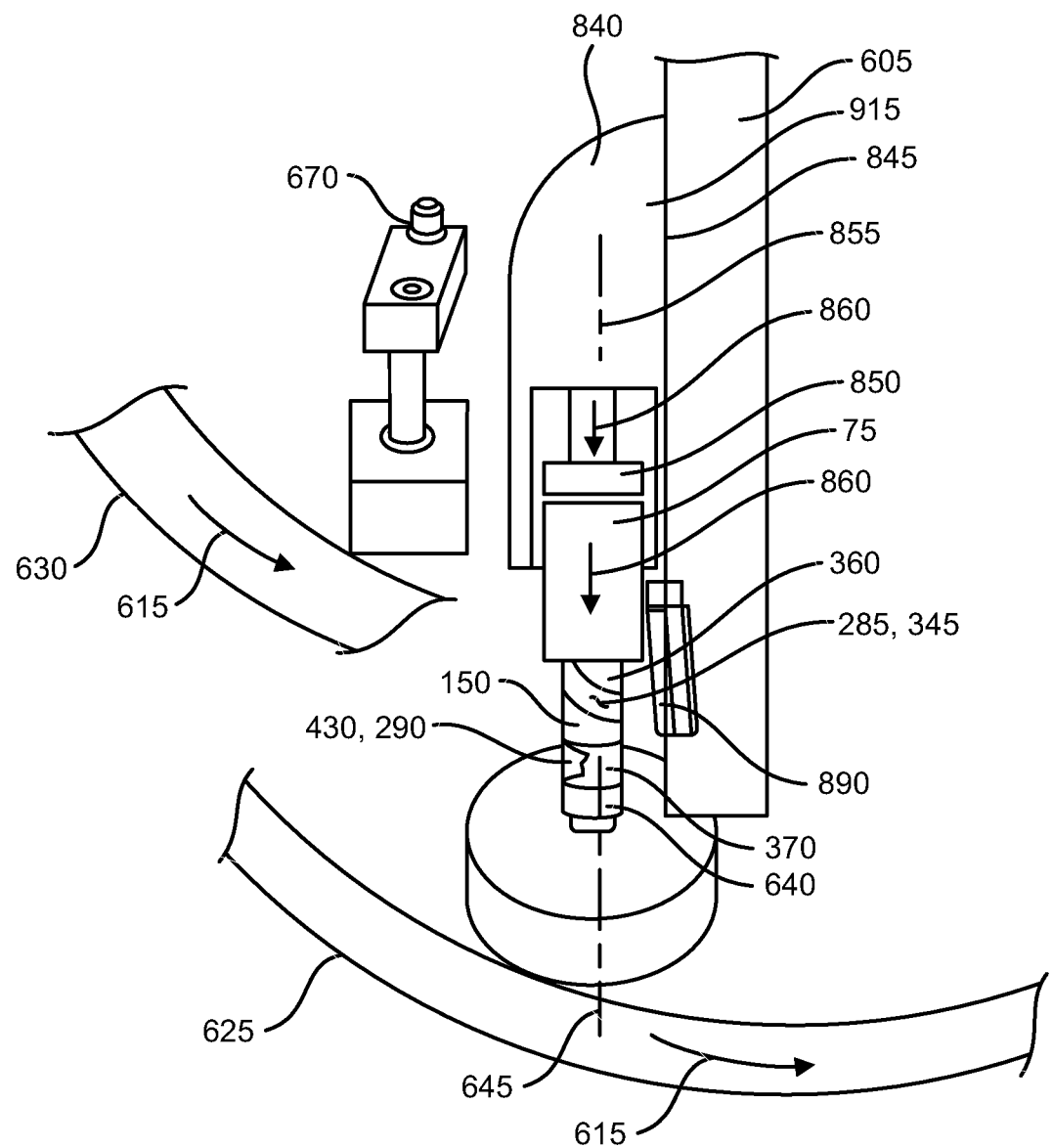

Further, FIG. 21 shows a perspective view of the manufacturing apparatus 600 showing in particular the clamshell element 150 and cover 370 with the completed and affixed flexible planar strip 345 having the helical progression 350, 355, and 360 as shown in FIGS. 13, 14, 15, 16, and 17, wherein FIG. 21 shows the split grasping clamp 890 through its pivotal attachment 895 to the base structure 605, with the split grasping clamp 890 drawing away 910 the clamshell element 150, cover 370, and flexible planar strip 345 all together, wherein the secondary cradle 665 is shown removed 885 from the non hinge protrusion portion of the clamshell element 150. Wherein FIG. 21 shows the clamshell element 150, cover 370, flexible planar strip 345 are all supported about the cradle axis 645 via the sleeving assembly 840 without the secondary cradle 665 or the grasping clamp 890, as the sleeving assembly 840 is positioned over 915 the clamshell element 150, the sleeving assembly 840 including a pivotal attachment 845 to the base structure 605, a reciprocating piston 850 having the reciprocating axis 855, and the surrounding sidewall 75 disposed within the sleeving assembly 840, wherein the piston 850 drives 860 the surrounding sidewall 75 over the helically wound 350, 355, and 360 flexible planar strip 345, clamshell element 150, and cover 370.

Figure 22:
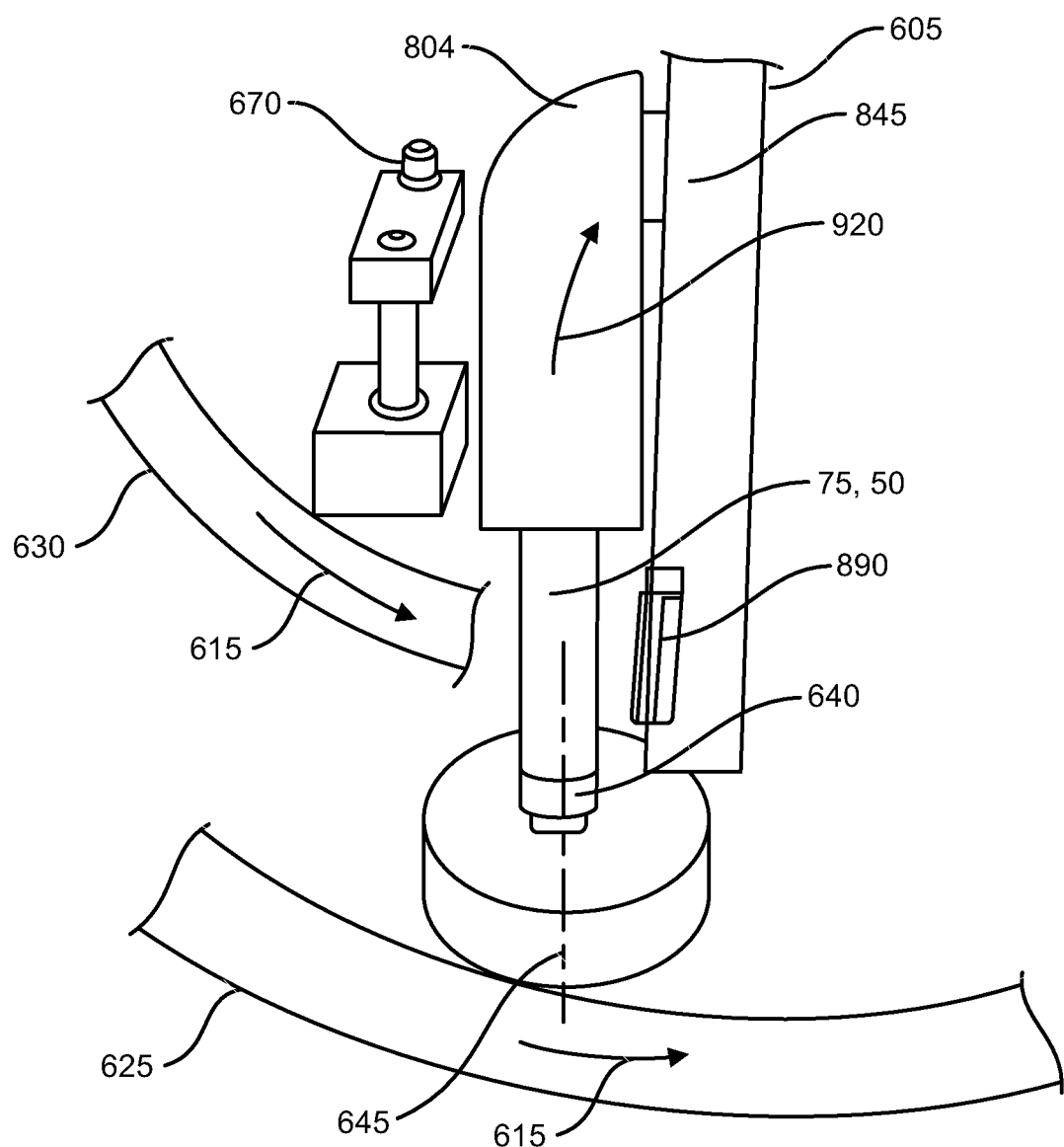

Continuing, FIG. 22 shows a perspective view of the manufacturing apparatus 600 showing in particular the assembled container apparatus 50 that includes the surrounding sidewall 75, the clamshell element 150, and the cover 370 with the completed and affixed flexible planar strip 345 having the helical progression 350, 355, and 360 as shown in FIGS. 13, 14, 15, 16, and 17, wherein FIG. 22 shows the surrounding sidewall 75 completely driven down 915 over the clamshell element 150, and the cover 370 with the completed and affixed flexible planar strip 345, wherein the sleeving assembly 840 is starting to draw away 920 from the assembled container apparatus 50, with the container apparatus 50 supported by the primary cradle 640 and the sleeving assembly 840 about the cradle axis 645.

Figure 23:
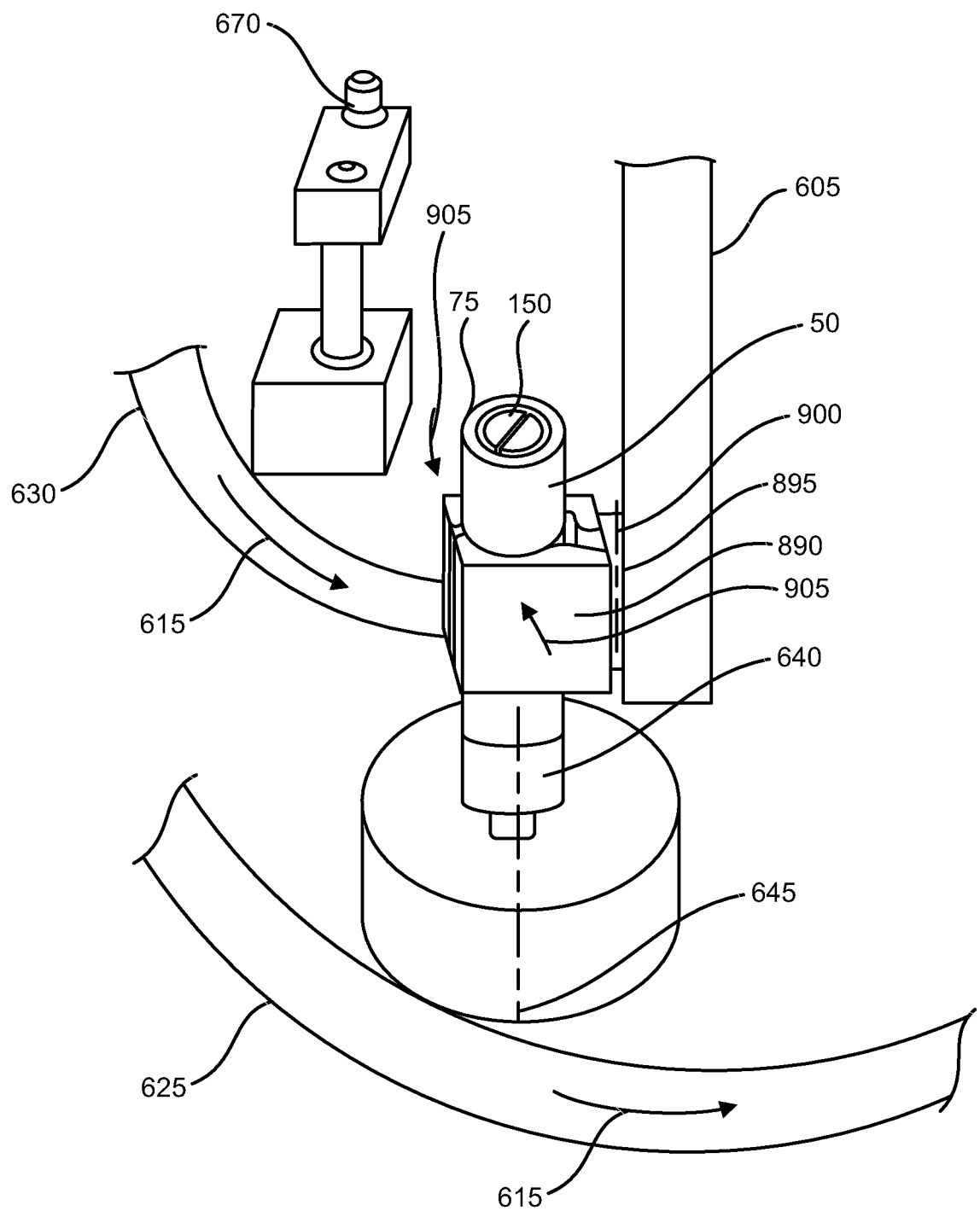
FIG. 23 shows a perspective view of the manufacturing apparatus showing in particular the assembled container apparatus with the sleeving assembly completely drawn away from the container apparatus requiring the split grasping clamp to return to encompass the surrounding sidewall, thus the split grasping clamp supporting the container apparatus without both the sleeving assembly or the secondary cradle.

Moving onward, FIG. 23 shows a perspective view of the manufacturing apparatus 600 showing in particular the assembled container apparatus 50 with the sleeving assembly 840 completely drawn away 920 from the container apparatus 50 requiring the split grasping clamp 890 to return to encompass 905 the surrounding sidewall 75, thus the split grasping clamp 890 and primary cradle 640 supporting the container apparatus 50 without both the sleeving assembly 840 or the secondary cradle 665.

Figure 24:
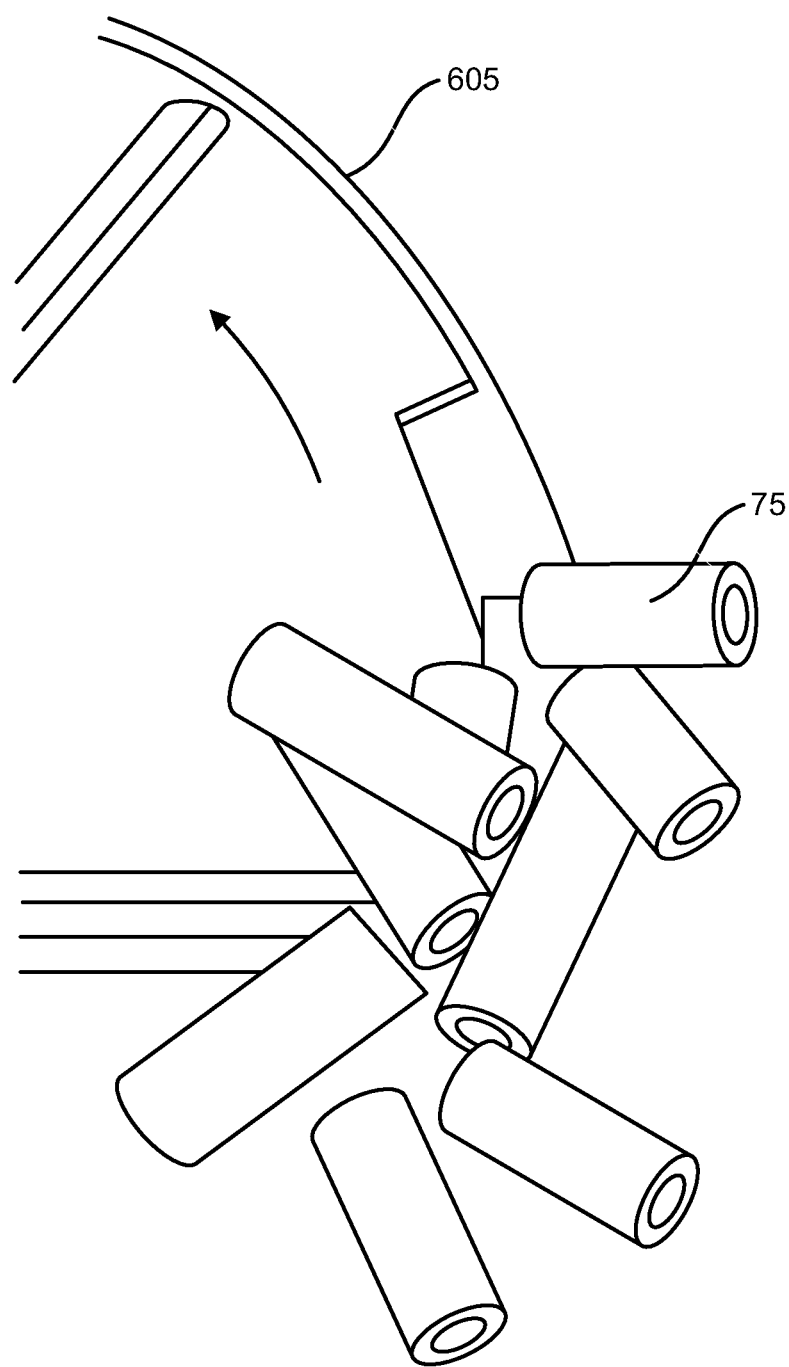
FIG. 24 shows the surrounding sidewalls feeding into the base structure that eventually go to the sleeving assembly.

Next, FIG. 24 shows the surrounding sidewalls 75 feeding into the base structure 605 that eventually go to the sleeving assembly 840.

Figure 25:
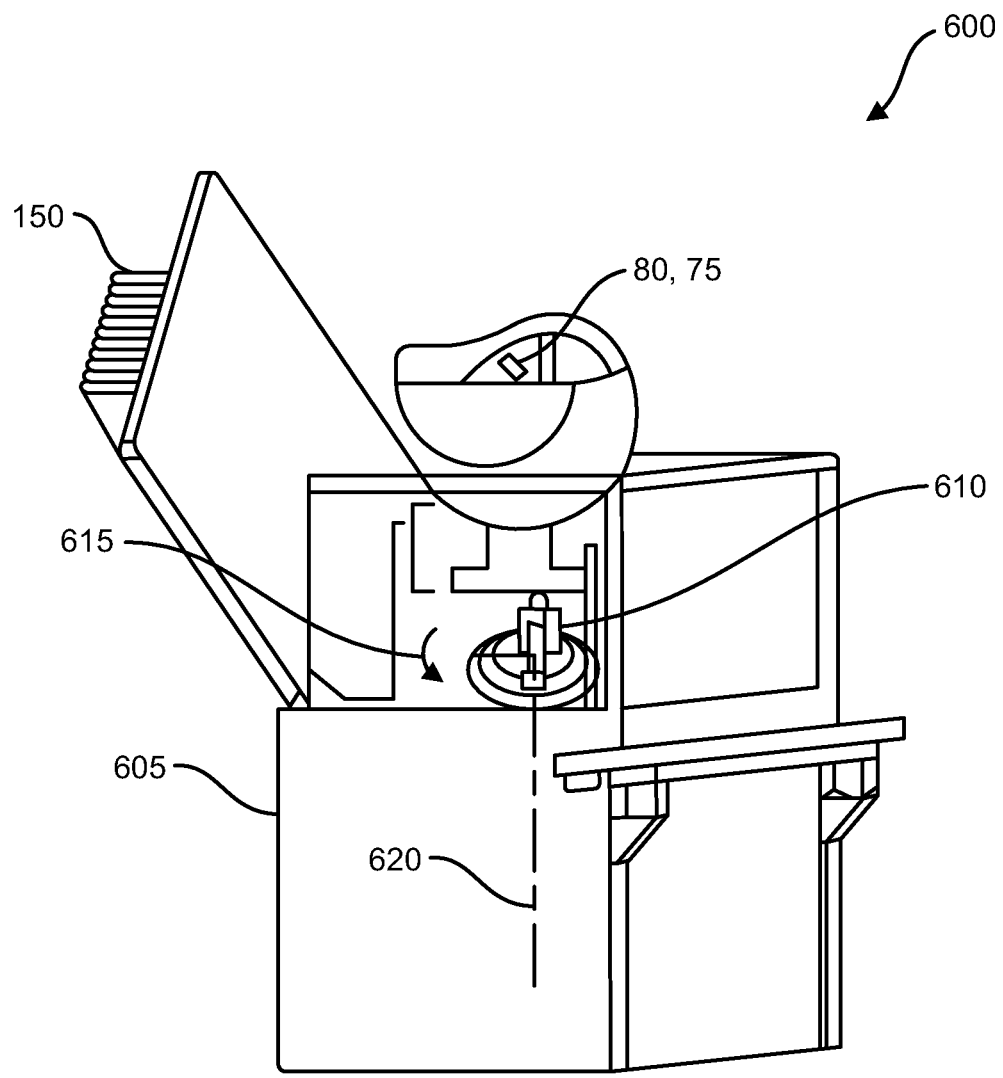
FIG. 25 shows a perspective view of the manufacturing apparatus showing the overall configuration of the base structure with the clamshell element feed, the surrounding sidewall feed, the position of the spindle, and the rotation of the spindle about the spindle axis.

Further, FIG. 25 shows a perspective view of the manufacturing apparatus 600 showing the overall configuration of the base structure 605 with the clamshell element 150 feed, the surrounding sidewall feed 75, the position of the spindle 610, and the rotation 615 of the spindle 610 about the spindle axis 620.

Figure 26:
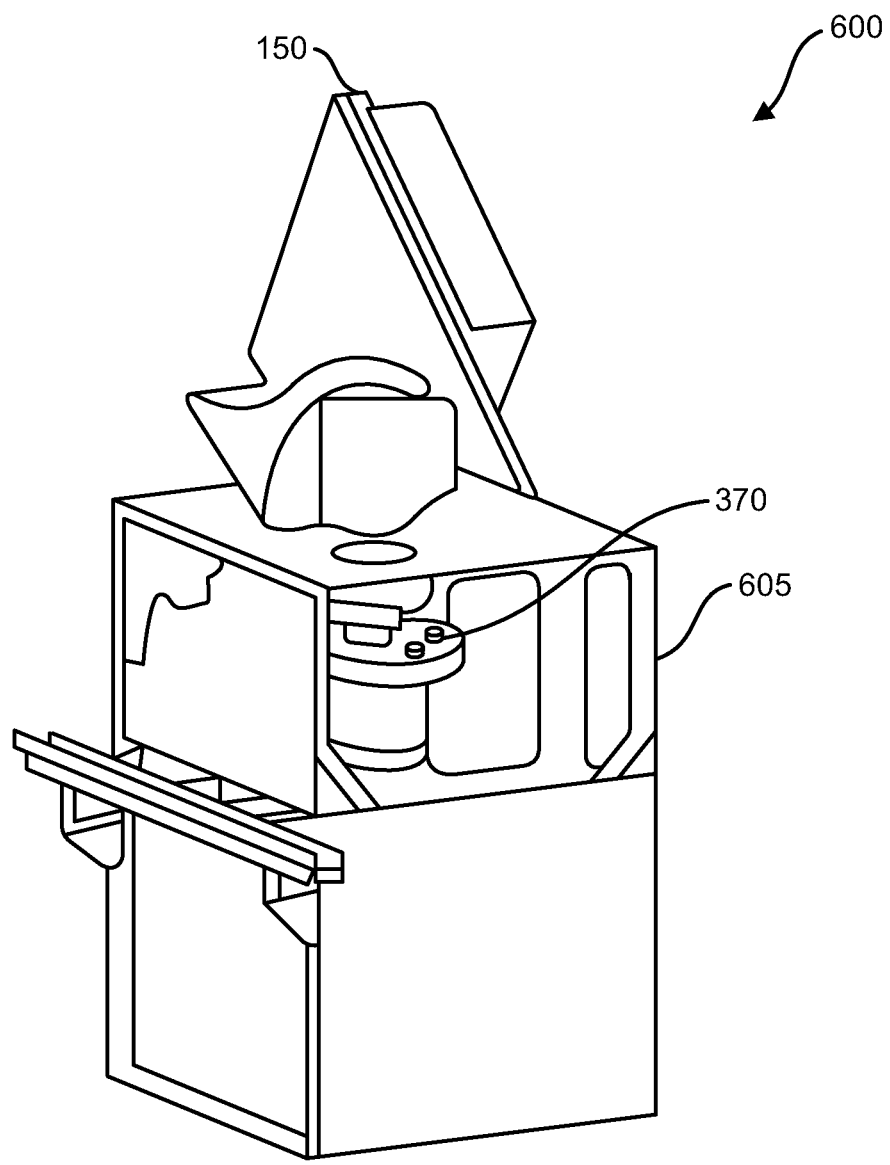
FIG. 26 shows a another perspective view of the manufacturing apparatus showing the overall configuration of the base structure with the bowl cover feed, and the clamshell element feed.

Continuing, FIG. 26 shows a another perspective view of the manufacturing apparatus 600 showing the overall configuration of the base structure 605 with the bowl cover 370 feed, and the clamshell element feed 150.

Figure 27:
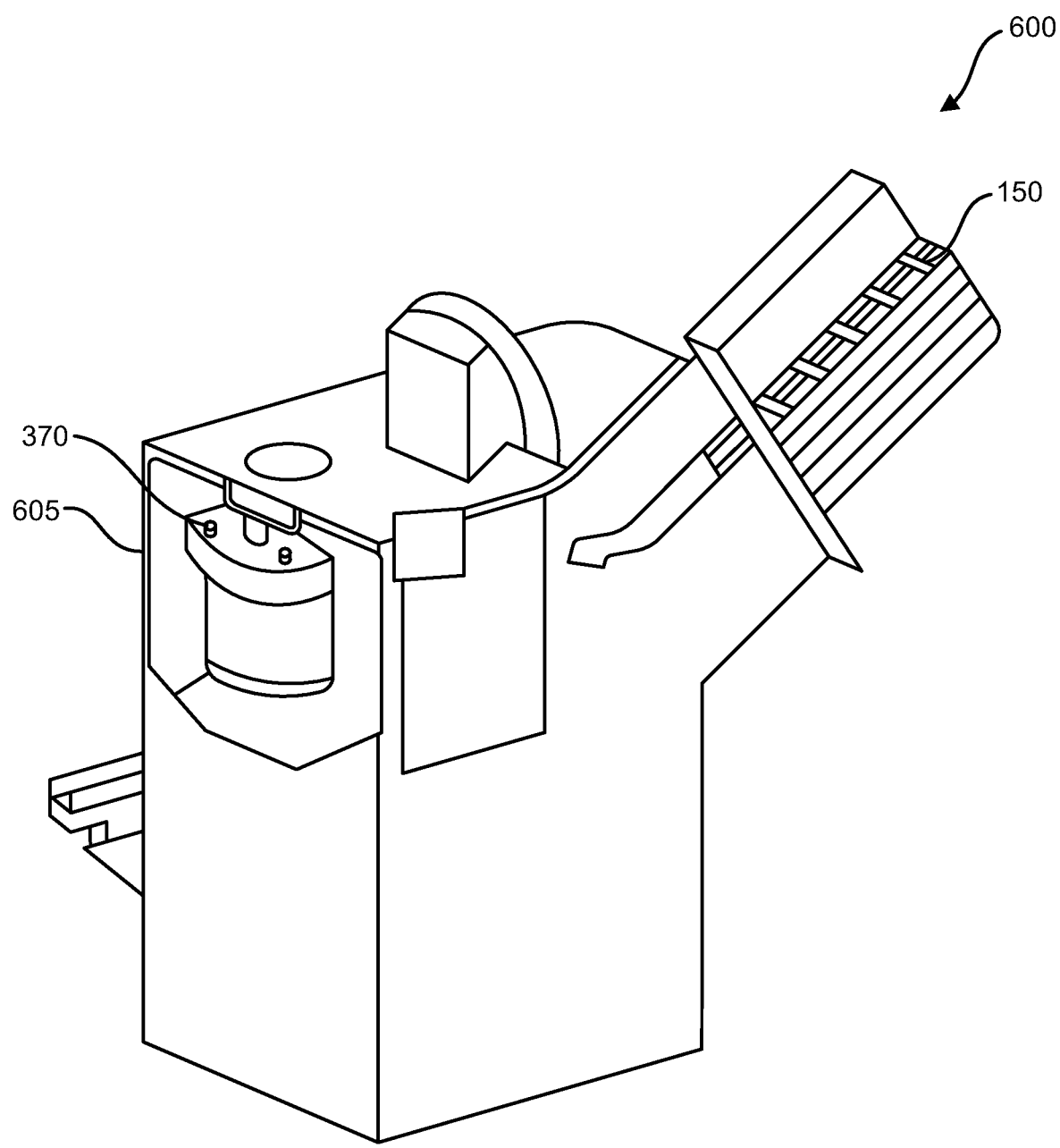
FIG. 27 shows a further perspective view of the manufacturing apparatus showing the overall configuration of the base structure with the bowl cover feed, and the clamshell element feed.

Further, FIG. 27 shows a further perspective view of the manufacturing apparatus 600 showing the overall configuration of the base structure 605 with the bowl cover 370 feed, and the clamshell element feed 150.

Broadly, the present invention is of the manufacturing apparatus 600 for assembling components of the container apparatus 50, see in particular FIGS. 1 to 8 for detail of the container apparatus 50, the container apparatus 50 having a longitudinal axis 85, a surrounding sidewall sleeve 75, 80, a bowl shaped cover 370 with a cavity 435 disposed in the cover 370, see FIG. 5, opposite of the cover 370 is the bowl shape, see FIG. 6, a folded closed state clamshell element 150, see FIGS. 1 to 4, and FIGS. 7, to 8, with a hinge 190 having a mating protrusion 195, a flexible planar strip 285, 345 having a primary end portion 290 and a secondary end portion 295 that are affixed 310, 315 with adhesive between respectively the cover 370 and the clamshell element 150, see FIG. 4 in particular. The manufacturing apparatus 600, see FIGS. 9 to 27, includes a base structure 605 that has a spindle 610 that rotates 615 about a spindle axis 620, the spindle 610 has a primary radially extending platform 625 and a parallel positioned 635 secondary radially extending platform 630, further including a primary cradle 640 that is rotationally engaged 650 about a cradle axis 645 to the primary radially extending platform 625, the primary cradle 640 having a primary cradle 640 concave portion 655 and a primary cradle 640 convex portion 660, see FIGS. 9 to 11.

In addition, the manufacturing apparatus includes a secondary cradle 665 that is rotationally engaged 670 about the cradle axis 645 to the secondary radially extending platform 630, the secondary cradle 665 having a secondary cradle 665 concave portion 675 and a secondary cradle 665 convex portion 680, wherein the primary cradle 640 convex portion 660 is positioned to face 685 the secondary cradle 665 concave portion 675, see in particular FIG. 11, plus FIGS. 9 and 10. Also included in the manufacturing apparatus 600 is a guide assembly 690 that is slidably engaged 695 having a guide assembly 690 slidable movement 700 to the base structure 605 along a guide axis 705, wherein the guide axis 705 is positioned parallel 710 to the cradle axis 645, see FIG. 16 in particular, wherein the guide assembly 690 operationally guides 715 the flexible planar strip 285, 345 along the cradle axis 645, see FIGS. 13 to 16.

The manufacturing apparatus 600 further includes a first means 725 for imparting rotational movement 720 to the primary cradle 640 about the cradle axis 645 and a second means 735 for imparting the guide assembly 690 slidable movement 700 to the guide assembly 690 between the primary 640 and the secondary 665 cradles simultaneously with the first means 725 for imparting rotational movement 720, see FIGS. 13 to 16.

Wherein operationally for the manufacturing apparatus 600 the cover 370 bowl shape is placed upon the primary cradle 640 convex portion 660 and the folded closed state 210 clamshell element 150 hinge 190 mating protrusion 195 is disposed within the cover 370 cavity 435 providing for rotational engagement 385, 435 between the cover 370 and the clamshell element 150 about the cradle axis 645, see FIGS. 2, 5, 7, and FIGS. 9 to 16. Further, the non-hinge end of the folded 210 clamshell element 150 is disposed within the secondary cradle 665 concave portion 675 thus facilitating the cover 370 and the clamshell element 150 rotating 720 in unison 745 about the cradle axis 645, next affixing 315 the secondary end portion 295 of the flexible planar strip 285, 345 to the clamshell element 150 adjacent to the secondary cradle 665, activating the first 725 and second means 735 to helically 350, 355, 360 wind the flexible planar strip 285, 345 progressively toward the cover 370 and affixing 310 the primary end portion 290 of the flexible planar element 285, 345 to the cover 370 adjacent to the primary cradle 640, see in particular FIG. 4 and FIGS. 13 to 17.

Alternatively, for the manufacturing apparatus 600 for assembling components of the container apparatus 50, wherein the first means 725 for imparting rotational movement 720 is preferably selected from the group 730 consisting of electric motors and pneumatic motors, see FIGS. 13 to 16.

Further, alternatively for the manufacturing apparatus 600 for assembling components of the container apparatus 50, wherein the second means 735 for imparting the slidable movement 700 is preferably selected from the group 740 consisting of electric solenoids and pneumatic actuators, see FIGS. 13 to 16.

Optionally, for the manufacturing apparatus 600 for assembling components of the container apparatus 50, can further comprise a valved adhesive nozzle assembly 750 that is slidably engaged 755 having an adhesive nozzle assembly 750 slidable movement 760 to the base structure 605 along an adhesive nozzle axis 765, the adhesive nozzle assembly 750 slidable movement 760 operates simultaneously with the first 725 and second 735 means, wherein the adhesive nozzle axis 765 is positioned parallel 770 to the cradle axis 645. Wherein the adhesive nozzle assembly 750 operationally affixes the flexible planar strip 285, 345 to both the affixing 315 of the secondary end portion 295 of the flexible planar strip 285, 345 to the clamshell element 150 adjacent to the secondary cradle 665 and affixing 310 the primary end portion 290 of the flexible planar strip 285, 345 to the cover 370 adjacent to the primary cradle 640 all along the cradle axis, 645, see in particular FIG. 4, also see FIGS. 13 to 16.

Another option for the manufacturing apparatus 600 for assembling components of the container apparatus 50, wherein the adhesive nozzle assembly 750 slidable movement 760 is preferably selected from the group 775 consisting of electric solenoids and pneumatic actuators, see FIGS. 13 to 16.

A further option for the manufacturing apparatus 600 for assembling components of the container apparatus 50, can further comprise a flexible planar strip 285, 345 holding and cutting head 780 that is slidably engaged 785 to the base 605 having both head 780 reciprocating movement 800 along a reciprocating head axis 805 perpendicular 810 to the cradle axis 645, see FIG. 13, and head 780 sliding movement 790 parallel 815 to the cradle axis 645, see FIG. 13, along a head 780 sliding movement axis 795, see FIGS. 13 to 16. Wherein operationally, through both the head 780 reciprocating movement 800 and the head 780 sliding movement 790 of the head 780 places the secondary end portion 295 of the flexible planar strip 285, 345 to the clamshell element 150 adjacent to the secondary cradle 665 and next the head 780 reciprocating movement 800 pulls the head 780 away from the cradle axis 645 releasing the flexible planar strip 285, 345 and through the head 780 sliding movement 790 and the head 780 reciprocating movement 800 of the head 780 positions to hold and cut the flexible planar strip 285,345 forming the primary end portion 290 of the flexible planar strip 285, 345 at the cover 370 adjacent to the primary cradle 640, again see FIGS. 13 to 16.

Another further option for the manufacturing apparatus 600 for assembling components of the container apparatus 50, is wherein the head 780 reciprocating movement 800 and head 780 sliding movement 790 are preferably selected from the group 820 consisting of electric solenoids and pneumatic actuators, see FIGS. 13 to 16.

Alternatively, for the manufacturing apparatus 600 for assembling components of the container apparatus 50, wherein the head 780 can further comprise an arcuate finger element 825 that extends from the head 780 being positioned to partially circumvent 830 the cradle axis 645, wherein operationally the arcuate finger element 825 nests 835 the secondary end portion 295 of the flexible planar strip 285, 345 to be adjacent to an outer periphery surface 160 of the clamshell element 150 to help enhance affixing 315 of the secondary end portion 295 of the flexible planar strip 285, 345 to the clamshell element 150 adjacent to the secondary cradle 665 being prior to starting the helical wind 350, 355, 360 the flexible planar strip 285, 345, see in particular FIG. 13 and also FIG. 4.

A further option for the manufacturing apparatus 600 for assembling components of the container apparatus 50, can further comprise a sleeving assembly 840 for disposing the surrounding sidewall 75 over the helically wound 350, 355, 360 flexible planar strip 285, 345 clamshell element 150, and cover 370, initially see FIGS. 17 to 24, wherein the sleeving assembly 840 is pivotally attached 845 to the base structure 605, the sleeving assembly 840 further includes a reciprocating piston 850 on a reciprocating axis 855 that drives 860 the surrounding sidewall 75 over the helically wound 350, 355, 360 flexible planar strip 285, 345 clamshell element 150 and cover 370.

The sleeving assembly 840 also includes a reciprocating 865 and pivoting 870 mechanism for the secondary cradle 665 having a secondary cradle 665 reciprocating axis 875 and a secondary cradle 665 pivoting axis 880 that operationally facilitates the secondary cradle 665 being removed 885 from the non-hinge end of the folded clamshell element 150, see in particular FIGS. 18 and 19, to allow access of the sleeving assembly 840 over the clamshell element 150 and cover 370. Further, to support the clamshell element 150 and cover 370 without the secondary cradle 665 support, a split grasping clamp 890 is pivotally attached 895 to the base structure 605 through a clamp pivoting axis 900, wherein the split grasping clamp 890 encompasses 905 the clamshell element 150 while the secondary cradle 665 is removed 885 from the clamshell element 150 to support the clamshell element 150, see FIGS. 19 and 20, until the sleeving assembly 840 is positioned over 915 and partially onto the clamshell element 150, at which time the split grasping clamp 890 moves away 910 from the clamshell element 150 to allow the sleeving assembly 840, see FIGS. 21 and 22, to complete driving 860 the surrounding sidewall 75 over the helically wound 350, 355, 360 flexible planar strip 285, 345 clamshell element 150 and cover 370, see FIGS. 20 to 22.

CONCLUSION

Accordingly, the present invention of the manufacturing apparatus has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:

1. A manufacturing apparatus for assembling components of a container apparatus, the container apparatus having a longitudinal axis, a surrounding sidewall sleeve, a bowl shaped cover with a cavity disposed in the cover opposite of the bowl shape, a folded closed state clamshell element with a hinge having a mating protrusion, a flexible planar strip having a primary end portion and a secondary end portion that are affixed with adhesive between respectively the cover and the clamshell element, said manufacturing apparatus comprising:
   (a) a base structure including a spindle that rotates about a spindle axis, said spindle has a primary radially extending platform and a parallel positioned secondary radially extending platform;
   (b) a primary cradle that is rotationally engaged about a cradle axis to said primary radially extending platform, said primary cradle having a primary cradle concave portion and a primary cradle convex portion;
   (c) a secondary cradle that is rotationally engaged about said cradle axis to said secondary radially extending platform, said secondary cradle having a secondary cradle concave portion and a secondary cradle convex portion, wherein said primary cradle convex portion is positioned to face said secondary cradle concave portion;
   (d) a guide assembly that is slidably engaged having a guide assembly slidable movement to said base structure along a guide axis, wherein said guide axis is positioned parallel to said cradle axis, wherein said guide assembly operationally guides the flexible planar strip along said cradle axis;
   (e) a first means for imparting rotational movement to said primary cradle about said cradle axis; and
   (f) a second means for imparting said guide assembly slidable movement to said guide assembly between said primary and said secondary cradles functioning simultaneously with said first means for imparting rotational movement, wherein operationally the cover bowl shape is placed upon said primary cradle convex portion and the folded closed state clamshell element hinge mating protrusion is disposed within the cover cavity providing for rotational engagement between the cover and the clamshell element about said cradle axis, and further the non-hinge end of the folded clamshell element is disposed within said secondary cradle concave portion thus facilitating the cover and the clamshell element rotating in unison about said cradle axis via said primary and secondary cradles, next affixing the secondary end portion of the flexible planar strip to the clamshell element adjacent to said secondary cradle, activating said first and second means to helically wind the flexible planar strip progressively toward the cover and affixing the primary end portion of the flexible planar element to the cover adjacent to said primary cradle.

2. A manufacturing apparatus for assembling components of a container apparatus according to claim 1 wherein said first means for imparting rotational movement is selected from the group consisting of electric motors and pneumatic motors.

3. A manufacturing apparatus for assembling components of a container apparatus according to claim 1 wherein said second means for imparting said slidable movement is selected from the group consisting of electric solenoids and pneumatic actuators.

4. A manufacturing apparatus for assembling components of a container apparatus according to claim 1 further comprising a valved adhesive nozzle assembly that is slidably engaged having an adhesive nozzle assembly slidable movement to said base structure along an adhesive nozzle axis, said adhesive nozzle assembly slidable movement operates simultaneously with said first and second means, wherein said adhesive nozzle axis is positioned parallel to said cradle axis, wherein said adhesive nozzle assembly operationally affixes the flexible planar strip to both the affixing of the secondary end portion of the flexible planar strip to the clamshell element adjacent to said secondary cradle and affixing the primary end portion of the flexible planar strip to the cover adjacent to said primary cradle all along said cradle axis.

5. A manufacturing apparatus for assembling components of a container apparatus according to claim 4 wherein said adhesive nozzle assembly slidable movement is selected from the group consisting of electric solenoids and pneumatic actuators.

6. A manufacturing apparatus for assembling components of a container apparatus according to claim 1 further comprising a flexible planar strip holding and cutting head that is slidably engaged to said base having both head reciprocating movement along a reciprocating head axis perpendicular to said cradle axis and head sliding movement parallel to said cradle axis along a head sliding movement axis, wherein operationally through both said head reciprocating movement and said head sliding movement said head places the secondary end portion of the flexible planar strip to the clamshell element adjacent to said secondary cradle and next said head reciprocating movement pulls said head away from said cradle axis releasing the flexible planar strip and through said head sliding movement and said head reciprocating movement said head positions to hold and cut the flexible planar strip forming the primary end portion of the flexible planar strip at the cover adjacent to said primary cradle.

7. A manufacturing apparatus for assembling components of a container apparatus according to claim 6 wherein said head reciprocating movement and head sliding movement are selected from the group consisting of electric solenoids and pneumatic actuators.

8. A manufacturing apparatus for assembling components of a container apparatus according to claim 6 wherein said head further comprises an arcuate finger element that extends from said head being positioned to partially circumvent said cradle axis, wherein operationally said arcuate finger element nests the secondary end portion of the flexible planar strip to be adjacent to an outer periphery surface of the clamshell element to help improve affixing of the secondary end portion of the flexible planar strip to the clamshell element adjacent to said secondary cradle being prior to starting the helical wind the flexible planar strip.

9. A manufacturing apparatus for assembling components of a container apparatus according to claim 1 further comprising a sleeving assembly for disposing the surrounding sidewall over the helically wound flexible planar strip clamshell element and cover, wherein said sleeving assembly is pivotally attached to said base structure, said sleeving assembly further includes a reciprocating piston on a reciprocating axis that drives the surrounding sidewall over the helically wound flexible planar strip clamshell element and cover, said sleeving assembly also including a reciprocating and pivoting mechanism for said secondary cradle having a secondary cradle reciprocating axis and a secondary cradle pivoting axis that operationally facilitates said secondary cradle being removed from the non-hinge end of the folded clamshell element to allow access of said sleeving assembly over the clamshell element and cover, further to support the clamshell element and cover without said secondary cradle support a split grasping clamp is pivotally attached to said base structure through a clamp pivoting axis, wherein said split grasping clamp encompasses the clamshell element while said secondary cradle is removed from the clamshell element to support the clamshell element and cover until said sleeving assembly is positioned over and partially onto the clamshell element, at which time said split grasping clamp moves away from the clamshell element to allow said sleeving assembly to complete driving the surrounding sidewall over the helically wound flexible planar strip clamshell element and cover.

* * * * *